US008924979B2

(12) United States Patent
Tanaka et al.

(10) Patent No.: US 8,924,979 B2
(45) Date of Patent: Dec. 30, 2014

(54) INFORMATION PROCESSING DEVICE AND CONTROL METHOD FOR SWITCHING BETWEEN PROCESSING UNITS RUNNING OPERATING SYSTEMS TO BE ASSOCIATED WITH A USER INTERFACE

(71) Applicant: Fujitsu Limited, Kawasaki-shi (JP)

(72) Inventors: Hideki Tanaka, Kawasaki (JP); Shinichi Shiotsu, Kawasaki (JP); Koichi Yokota, Kawasaki (JP); Isamu Yamada, Kawasaki (JP); Hiroyasu Sugano, Kawasaki (JP); Akira Itasaki, Kawasaki (JP); Daisuke Yamashita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 268 days.

(21) Appl. No.: 13/669,570

(22) Filed: Nov. 6, 2012

(65) Prior Publication Data

US 2013/0191834 A1    Jul. 25, 2013

(30) Foreign Application Priority Data

Jan. 24, 2012    (JP) ................................. 2012-012497

(51) Int. Cl.
*G06F 9/48*    (2006.01)
(52) U.S. Cl.
USPC ........................................................ 718/102
(58) Field of Classification Search
CPC ........................................................ G06F 9/48
USPC ........................................................ 718/102
See application file for complete search history.

(56) References Cited

U.S. PATENT DOCUMENTS

| 5,742,824 | A * | 4/1998 | Kosaka ......................... 718/106 |
| 6,865,621 | B2 * | 3/2005 | Iwata ............................. 710/20 |
| 8,312,476 | B2 * | 11/2012 | Chin et al. .................... 719/319 |
| 8,312,477 | B2 * | 11/2012 | Lin ................................ 719/319 |
| 2013/0125126 | A1 * | 5/2013 | Yokota et al. ................. 718/102 |

FOREIGN PATENT DOCUMENTS

| JP | 2005-196433 | 7/2005 |
| JP | 2005-202691 | 7/2005 |
| JP | 2005-242686 | 9/2005 |
| JP | 2006-211541 | 8/2006 |

* cited by examiner

*Primary Examiner* — Emerson Puente
*Assistant Examiner* — Willy W Huaracha
(74) *Attorney, Agent, or Firm* — Fujitsu Patent Center

(57) ABSTRACT

A method of controlling an information processing device includes selectively switching a first processor for executing a first operating system or a second processor for executing a second operating system to a user interface; storing a data table in which a first application program operating on the first operating system is associated with a second application program operating on the second operating system; sending information pertinent to activation of the first or second application program to a server device; receiving a result of a process from the server device, the process being performed by the server device for associating application programs based on the received information; updating the data table based on the received result; and activating the second application program, which is associated with the first application program being activated in the data table, in a state where the first processor has been switched to the user interface.

9 Claims, 24 Drawing Sheets

FIG.4

| CLASSIFICATION | APPLICATION(112) | APPLICATION(208) |
|---|---|---|
| VIEW/EDIT PHOTOGRAPH | Image Viewer APPLICATION | PhotoShop |
| REPRODUCE VIDEO | Blu-ray Disc REPRODUCTION LIST DISPLAY APPLICATION | Win DVD |
| OFFICE SYSTEM TOOL | Excel Viewer | MICROSOFT Excel |
| | | MICROSOFT Word |

| APPLICATION 112 | APPLICATION 208 | STATISTICAL VALUE |
|---|---|---|
| APPLICATION A | APPLICATION B | 67% |
| APPLICATION A | APPLICATION C | 33% |
| APPLICATION X | APPLICATION Y | 67% |
| APPLICATION X | APPLICATION Z | 33% |

514

SELECT ← (67% row for APPLICATION B)
SELECT ← (67% row for APPLICATION Y)

| APPLICATION 112 | APPLICATION 208 | STATISTICAL VALUE |
|---|---|---|
| APPLICATION A | APPLICATION B | 20% |
| APPLICATION A | APPLICATION C | 80% |

504(2)

| APPLICATION 112 | APPLICATION 208 | STATISTICAL VALUE |
|---|---|---|
| APPLICATION A | APPLICATION B | 100% |
| APPLICATION X | APPLICATION Z | 100% |

504(3)

| APPLICATION 112 | APPLICATION 208 | STATISTICAL VALUE |
|---|---|---|
| APPLICATION A | APPLICATION B | 100% |
| APPLICATION X | APPLICATION Y | 50% |
| APPLICATION X | APPLICATION Z | 50% |

514

| APPLICATION 112 | APPLICATION 208 | STATISTICAL VALUE |
|---|---|---|
| APPLICATION A | APPLICATION B | 73% |
| APPLICATION A | APPLICATION C | 27% |
| APPLICATION X | APPLICATION Y | 25% |
| APPLICATION X | APPLICATION Z | 75% |

| APPLICATION 112 | APPLICATION 208 | STATISTICAL VALUE |
|---|---|---|
| APPLICATION A | APPLICATION B | 73% |
| APPLICATION A | APPLICATION C | 27% |
| APPLICATION X | APPLICATION Y | 25% |
| APPLICATION X | APPLICATION Z | 75% |

120(1)(BEFORE UPDATING)

| APPLICATION 112 | APPLICATION 208 | STATISTICAL VALUE |
|---|---|---|
| APPLICATION A | APPLICATION B | 20% |
| APPLICATION A | APPLICATION C | 80% |

120(1)AFTER UPDATING

| APPLICATION 112 | APPLICATION 208 | STATISTICAL VALUE |
|---|---|---|
| APPLICATION A | APPLICATION B | 20% |
| APPLICATION A | APPLICATION C | 80% |
| APPLICATION X | APPLICATION Y | 25% |
| APPLICATION X | APPLICATION Z | 75% |

INFORMATION PROCESSING DEVICE AND CONTROL METHOD FOR SWITCHING BETWEEN PROCESSING UNITS RUNNING OPERATING SYSTEMS TO BE ASSOCIATED WITH A USER INTERFACE

CROSS-REFERENCE TO RELATED APPLICATION

This patent application is based upon and claims the benefit of priority of the prior Japanese Patent Application No. 2012-012497 filed on Jan. 24, 2012, the entire contents of which are incorporated herein by reference.

FIELD

The embodiments discussed herein are related to a control method of an information processing device and an information processing device.

BACKGROUND

Conventionally, there is known an information processing device in which plural operating systems (hereinafter, "OS") are installed. By making it possible to switch the OS, the user may use application programs (hereinafter, "applications") dependent on the respective types of OSs with a single information processing device, and therefore the convenience of the information processing device is enhanced.

FIG. 1 illustrates an example of a usage format by the user of a dual OS terminal (information processing device) in which two types of OSs are installed. First, at time point (1), the user is viewing a video with an application operating on a first OS. Next, at time point (2), the user desires to edit the video that he has viewed. Assuming that the second OS has more applications relevant to editing videos, the user probably wants to switch the OS to the second OS. Therefore, at time point (3), the user manually switches the OS and the display screen, etc., to that of the second OS. At time point (4), after the second OS is activated, the user looks for an application relevant to editing videos, and activates the application that has been found. Then, at time point (5), the user edits the video by the activated application.

In relation to the above technology, there is known an information processing device for exclusively switching the operating environment. In this information processing device, the operation environment is switched so that either the first OS or the second OS may operate. Furthermore, in this information processing device, in order to switch the OS, the user ends the OS that is being executed, and then after that, when the information processing device is activated, the OS is switched to the other OS. Furthermore, in this information processing device, when a predetermined message is stored in the storage device while a first OS is being executed, subsequently, when the power is turned on or the information processing device is rebooted, the OS that is to execute the stored message (for example, the second OS) starts operating.

Furthermore, there is known a remote control device that switches TV channels by remote control. In this device, the operation pattern of the person operating the remote control, personal information (hobbies, etc.) of the person, and statistical information based on operation history are used to automatically select a particular channel after the power is turned on.

Patent document 1: Japanese Laid-Open Patent Publication No. 2005-202691

Patent document 2: Japanese Laid-Open Patent Publication No. 2006-211541

However, in a conventional information processing device, the user needs to manually reboot the device to switch the OS, or to push a button to instruct the switch, and therefore it takes time and effort to switch the OS. Furthermore, it takes further time and effort to look for the desired application in the switched OS and to activate the application.

The information processing device described in patent document 1 may be able to automatically determine the OS to be selected when the information processing device is activated, but to switch the OS, the user's operation is needed. Furthermore, the user needs to take the trouble of selecting the application.

As described above, in a conventional information processing device, the convenience has been insufficient in terms of switching the OS and the application.

Furthermore, the device described in patent document 2 is not for controlling operating systems or application programs, and therefore it is difficult to apply this to the technology of controlling operations of an information processing device.

SUMMARY

According to an aspect of the embodiments, a method of controlling an information processing device includes selectively switching a first processor configured to execute a first operating system or a second processor configured to execute a second operating system to a user interface; storing a data table in which a first application program operating on the first operating system is associated with a second application program operating on the second operating system; sending information pertinent to activation of the first application program or the second application program to a server device; receiving a process result of a process from the server device, the process being performed by the server device for associating application programs based on the information received from the information processing device; updating the data table based on the process result received from the server device; and activating the second application program, which is associated with the first application program being activated in the data table, in a state where the first processor has been switched to the user interface.

The object and advantages of the invention will be realized and attained by means of the elements and combinations particularly pointed out in the appended claims. It is to be understood that both the foregoing general description and the following detailed description are exemplary and explanatory and are not restrictive of the invention as claimed.

BRIEF DESCRIPTION OF THE DRAWINGS

FIG. 4 illustrates an example of a relevant application data local table;

FIG. 14 illustrates how combinations of applications are selected by a relevant application data table selecting unit;

FIG. 20 illustrates how the relevant application data statistic table is generated based on the relevant application data master tables;

FIG. 21 illustrates how a relevant application data local table of the information processing device is updated as a result of the statistical process performed by the server device based on the activated application logs collected from the information processing devices;

DESCRIPTION OF EMBODIMENTS

Preferred embodiments of the present invention will be explained with reference to accompanying drawings.

Embodiments
First embodiment

A description is given of a control method of an information processing device and the information processing device according to a first embodiment of the present invention with reference to drawings.

Hardware Configuration

Figure 1:
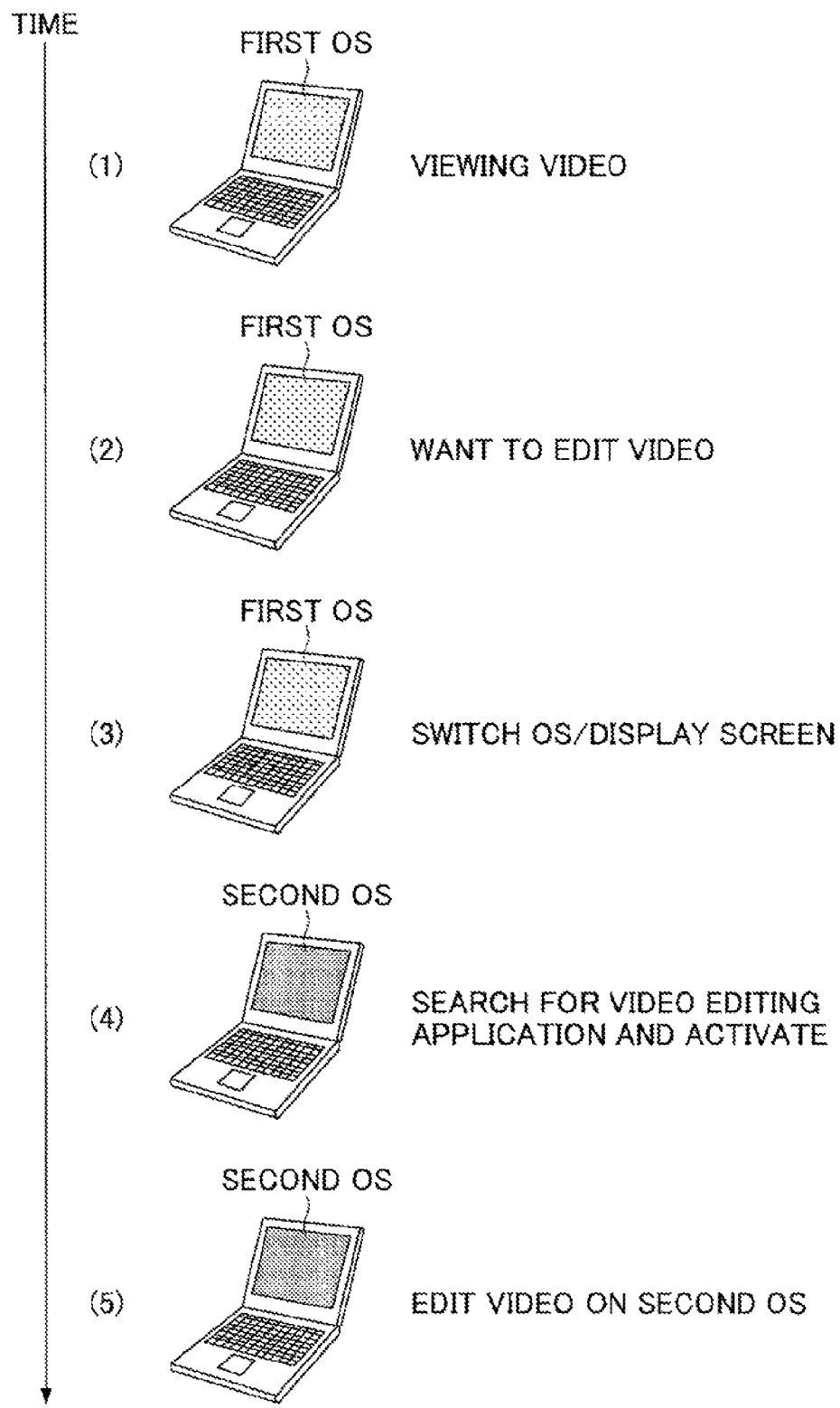
FIG. 1 illustrates an example of a usage format by the user of a dual OS terminal (information processing device) in which two types of OS are installed.
Figure 2:
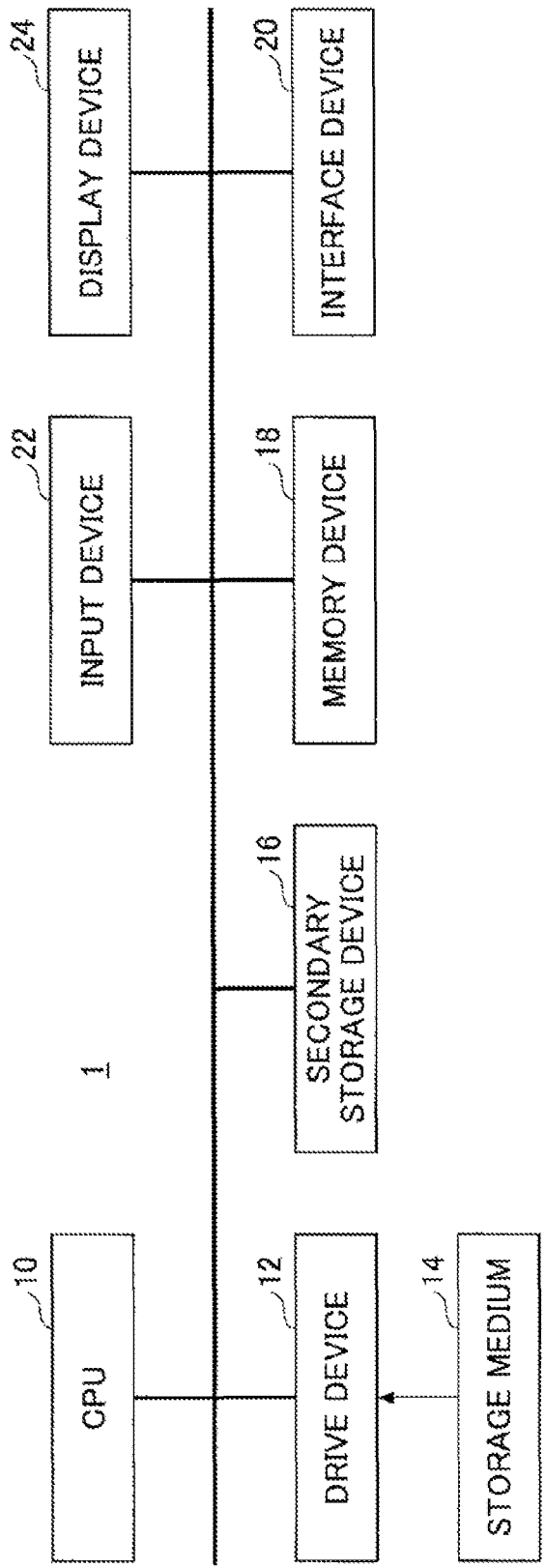
FIG. 2 illustrates a hardware configuration of an information processing device according to a first embodiment of the present invention.

FIG. 2 illustrates a hardware configuration of an information processing device 1 according to the first embodiment of the present invention. The information processing device 1 includes a CPU (Central Processing Unit) 10, a drive device 12, a secondary storage device 16, a memory device 18, an interface device 20, an input device 22, and a display device 24. These elements are connected to each other via a bus or a serial line.

The CPU 10 is a processor including a program counter, a command decoder, various computing units, a LSU (Load Store Unit), and a general-purpose register.

The drive device 12 reads programs and data from a storage medium 14. When the storage medium 14 recording a program is inserted in the drive device 12, the program is installed in the secondary storage device 16 from the storage medium 14 via the drive device 12. The storage medium 14 is a portable storage medium such as a CD (Compact Disc), a DVD (Digital Versatile Disc), and a USB (Universal Serial Bus) memory. Furthermore, the secondary storage device 16 is a HDD (Hard Disk Drive) or a flash memory.

A program may be installed by using the storage medium 14 as described above, or by being downloaded from another computer via a network, and installed in the secondary storage device 16. The network may be the Internet, LAN (Local Area Network), or a wireless network. The program may be stored in advance in the secondary storage device 16 or a ROM (Read-Only Memory) when the information processing device 1 is shipped.

When the CPU 10 executes a program that has been installed or stored in advance, an information processing device having the format illustrated in FIG. 2 may function as the information processing device 1 according to the present invention.

The memory device 18 is, for example, a RAM (Random-Access Memory) or an EEPROM (Electrically Erasable and Programmable Read-Only Memory). The interface device 20 controls the connection with the above network.

The input device 22 is, for example, a keyboard, a mouse, a button, a touch pad, a touch panel, and a microphone. The display device 24 is, for example, a LCD (Liquid Crystal Display) and a CRT (Cathode Ray Tube). The information processing device 1 may include other types of output devices such as a printer and a speaker, other than the display device 24.

Figure 3:
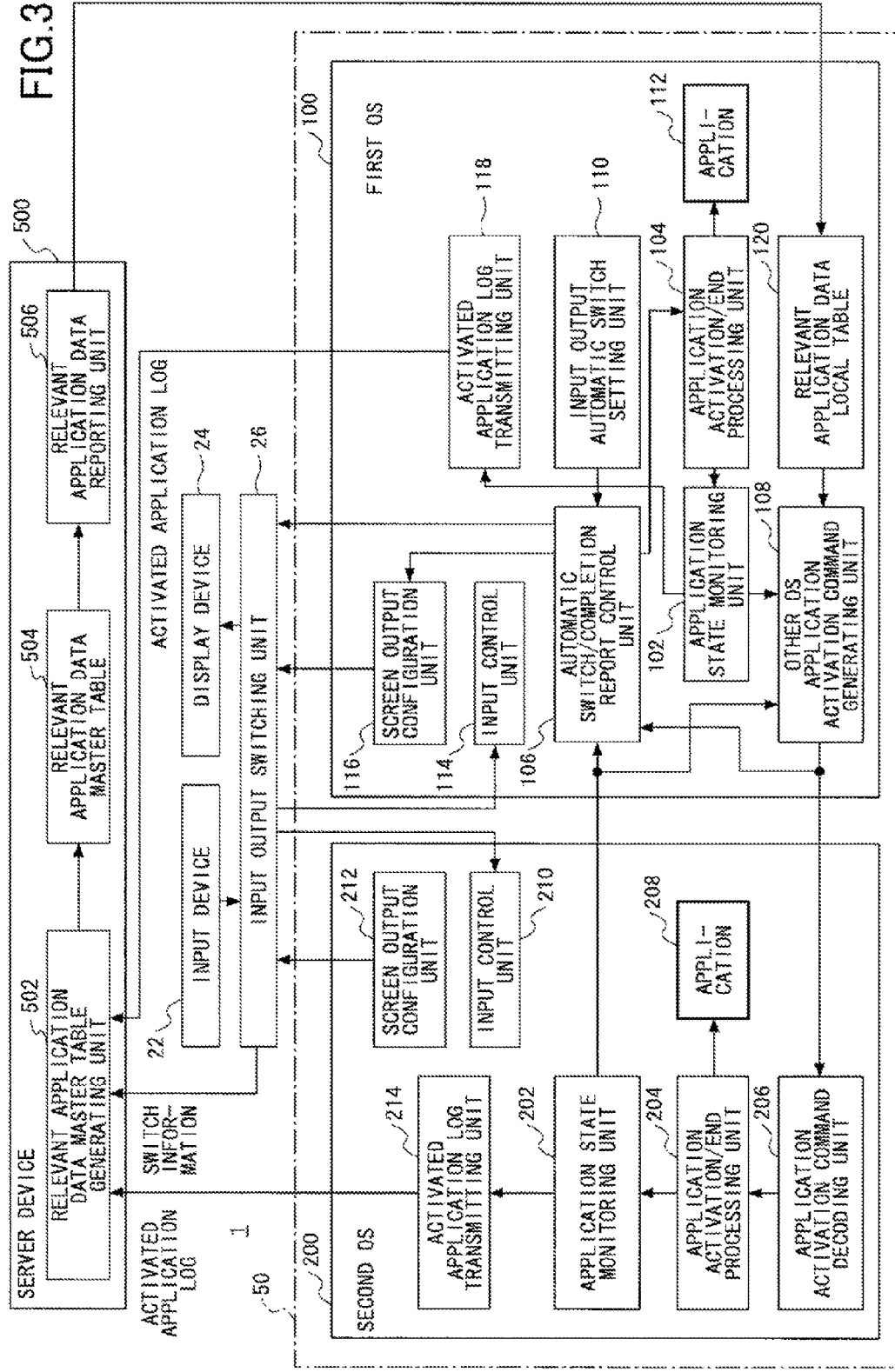
FIG. 3 illustrates functional configurations of the information processing device and a server device according to the first embodiment of the present invention.

A server device 500 is the same computer as the information processing device 1 (see FIG. 3).

Functional Configuration

FIG. 3 illustrates functional configurations of the information processing device 1 and the server device 500. In the information processing device 1, a first OS 100 and a second OS 200 are operated by sharing a platform 50. The platform 50 includes at least one of the CPU 10, the drive device 12, the secondary storage device 16, the memory device 18, and the interface device 20. In the present embodiment, the first OS 100 and the second OS 200 are executed by virtual processing units of a first processor and a second processor, respectively.

To the input device 22 and the display device 24 which are user interfaces, an input output switching unit 26 is connected. The input output switching unit 26 outputs input output switching signals to the input device 22 and the display device 24 according to instructions from the OSs, and associates the input device 22 and the display device 24 with either one of the two OSs. For example, the input output switching unit 26 implements switching by causing the display device 24 to selectively display a display screen by the first OS 100 and a display screen by the second OS 200. Furthermore, the input output switching unit 26 implements switching so that the contents input to the input device 22 are applied to the first OS 100 or the second OS 200. Furthermore, the input output switching unit 26 sends, to the server device 500, information relevant to the timing when the change in association has been made (hereinafter, "switch information").

Instead of selectively switching the entire display screen, the input output switching unit 26 may display the display screen by one of the OSs in a main part and display the display screen by the other OS in a sub part.

In the present embodiment, basically, either one of the first OS 100 or the second OS 200 is selected and operated; however, the first OS 100 and the second OS 200 may operate in parallel by time-sharing. Even while the first OS 100 and the second OS 200 are operating in parallel, the display device 24 selectively displays the display screen of the other one of the OSs.

On the first OS 100, an application state monitoring unit 102, an application activation/end processing unit 104, an automatic switch/completion report control unit 106, an other OS application activation command generating unit 108, an input output automatic switch setting unit 110, and applications 112 operate. Furthermore, on the first OS 100, an input control unit 114, a screen output configuration unit 116, and an activated application log transmitting unit 118 operate. The other OS application activation command generating unit 108 may refer to a relevant application data local table 120 stored in the secondary storage device 16 and the memory device 18. The first OS 100 is, for example, Android (registered trademark).

On the second OS 200, an application state monitoring unit 202, an application activation/end processing unit 204, an application activation command decoding unit 206, applications 208, an input control unit 210, a screen output configuration unit 212, and an activated application log transmitting unit 214 operate. The second OS 200 is, for example, Windows (registered trademark).

The functional blocks operating on each OS function when the CPU 10 executes program software stored in the secondary storage device 16 and the ROM. These functional blocks are not always implemented by programs that are clearly separated; the functional blocks may be called by other programs as a subroutine or a function. Some of the functional blocks may be hardware units such as an IC (integrated Circuit) and a FPGA (Field Programmable Gate Array).

The applications 112 and the applications 208 are, for example, an Internet browser, a mailer, a video reproducing application, a video editing application, a still image viewing application, a still image editing application, a document editing application, a spreadsheet application, and a note pad, which may operate on the respective OSs. In the present embodiment, the group of applications operating on the OSs is collectively referred to as the applications 112 and the applications 208.

The assumed power consumption of the second OS 200 is larger than that of the first OS 100. The assumed power consumption of the system that is constructed centering around an OS is determined by the operating frequency of the CPU, the average usage rate of the CPU and processing time per unit time of the software, the supplied voltage, and the average usage amount of a memory per unit time. Furthermore, the assumed power consumption of different systems constructed centering around OSs is determined by the power consumed to execute the same process. The present embodiment uses processes that are more simple than those of Windows used as the second OS 200, and therefore the average usage rate of the CPU and processing time per unit time of the software and the average usage amount of a memory per unit time are lower than those of Windows. Android, which consumes less power for executing the same process than Windows, is used as the first OS 100, and therefore it is assumed that the power consumption of the second OS 200 is higher than that of the first OS 100.

The application state monitoring unit 102 monitors the states of the applications 112, and when one of the applications 112 is activated or ended, the application state monitoring unit 102 outputs application activation/end information reporting this to the other OS application activation command generating unit 108. The application state monitoring unit 102 refers to the application activation/end information input from the application activation/end processing unit 104 to recognize the state of the application 112.

When the input control unit 114 detects a user operation input to the display device 24, the application activation/end processing unit 104 executes an activation process or an end process on the application 112.

The automatic switch/completion report control unit 106 receives application activation/end report information from the application state monitoring unit 202, and receives input of an application activation command from the other OS application activation command generating unit 108. The automatic switch/completion report control unit 106 implements control for causing the display device 24 to display activation completion report information of the applications 208 and sending input output switching information to the input output switching unit 26, as described below. The automatic switch/completion report control unit 106 switches these control contents according to automatic switch setting information input from the input output automatic switch setting unit 110. Details of these control operations are described below.

The other OS application activation command generating unit 108 searches the relevant application data local table 120 with the use of the application activation/end information input from the application state monitoring unit 102, and extracts the application 208 relevant to the activated application 112. The other OS application activation command generating unit 108 refers to the application activation/end report information received from the application state monitoring unit 202, and determines whether the application 208 relevant to the activated application 112, i.e., the application 112 with which the input device 22 and the display device 24 are associated, has been activated. When the application 208 relevant to the activated application 112 has not been activated, the other OS application activation command generating unit 108 generates an other OS application activation command, and outputs the other OS application activation command to the application activation command decoding unit 206 and the automatic switch/completion report control unit 106.

The relevant application data local table 120 is a data table in which an application included in the applications 112 is associated with an application considered to be relevant to usage by the user included in the applications 208. FIG. 4 illustrates an example of the relevant application data local table 120.

As illustrated in FIG. 4, in the relevant application data local table 120, for example, Image Viewer is associated with Photo Shop (registered trademark) that is a relevant application. Furthermore, in the relevant application data local table 120, for example, a Blu-ray (registered trademark) Disc reproduction list display application is associated with Win DVD (registered trademark. Furthermore, in the relevant application data local table 120, for example, an Excel Viewer application is associated with MICROSOFT (registered trademark) Excel and MICROSOFT (registered trademark) Word.

The initial contents in the relevant application data local table 120 may be determined in advance when the information processing device 1 is shipped, or may be set by a user. In either case, the contents of the relevant application data local table 120 are updated based on data received from the server device 500.

In the relevant application data local table 120, the applications included in the applications 112 are not always associated one-on-one with the applications included in the applications 208. There may be plural applications 208 associated with a single application 112. Furthermore, there may be plural applications 112 associated with a single application 208 (or plural applications 208).

The input output automatic switch setting unit 110 detects an operation by the user using the input device 22, and holds automatic switch setting information for instructing the control mode of the automatic switch/completion report control unit 106 determined by this operation. The automatic switch setting information is a flag for determining whether to automatically switch to the second OS 200, after displaying that activation of the application 208 has been completed. Then, the input output automatic switch setting unit 110 outputs the switch setting information to the automatic switch/completion report control unit 106.

The input control unit 114 detects input to the input device 22 from the user and outputs the detected input to the respective functional blocks, when the input output switching unit 26 has associated the input device 22 and the display device 24 with the first OS 100.

The screen output configuration unit 116 determines the screen configuration according to the first OS 100 or the application 112, and sends the determined screen configuration to the display device 24 via the input output switching unit 26.

The activated application log transmitting unit 118 sends, to the server device 500, information (hereinafter, "activated application log") relevant to the activation timing of the application 112 activated on the first OS 100.

The application state monitoring unit 202 monitors the state of the application 208, and when the application 208 is activated or ended, the application state monitoring unit 202 sends, to the application activation command decoding unit 206, application activation/end report information for reporting this. The application state monitoring unit 202 refers to the application activation/end information input from the application activation/end processing unit 204, and recognizes the state of the application 208.

The application activation/end processing unit 204 executes an activation process or an end process on the application 208 according to a user operation input to the display device 24 or application activation instruction information input from the application activation command decoding unit 206.

The application activation command decoding unit 206 decodes an application activation command input from the other OS application activation command generating unit 108, and outputs an application activation instruction to the application activation/end processing unit 204 according to the decoded result.

The input control unit 210 detects input to the input device 22 from the user and outputs the detected input to the respective functional blocks, when the input output switching unit 26 has associated the input device 22 and the display device 24 with the second OS 200.

The screen output configuration unit 212 determines the screen configuration according to the second OS 200 or the application 208, and sends the determined screen configuration to the display device 24 via the input output switching unit 26.

The activated application log transmitting unit 214 sends, to the server device 500, information (hereinafter, "activated application log") relevant to the activation timing of the application 208 activated on the second OS 200.

Process of Automatically Activating Application of Other OS

In the following, a description is given of a process of automatically activating an application of the other OS (other OS application automatic activation process) performed by the information processing device 1 of the present embodiment, with reference to a sequence diagram and a flowchart.

Sequence Diagram

Figure 5:
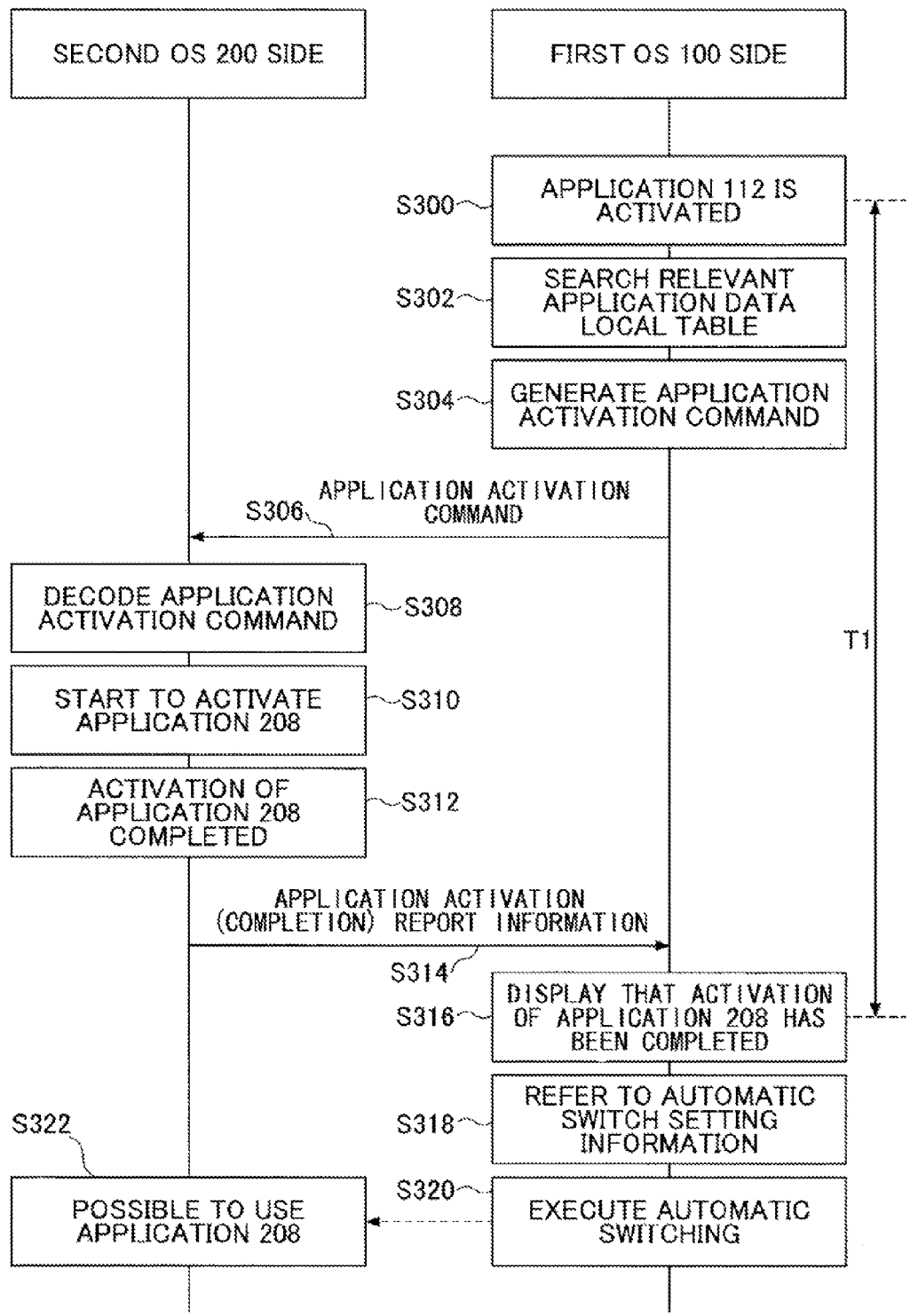
FIG. 5 is a sequence diagram indicating a flow of a process executed by the information processing device.

FIG. 5 is a sequence diagram indicating a flow of a process executed by the information processing device 1. Details of the determination process are described with reference to flowcharts, and the overview of the process is described with the sequence diagram.

The application 112 is activated on the first OS 100 (step S300). When the application 112 is activated, application activation information is input from the application state monitoring unit 102 to the other OS application activation command generating unit 108. When the application activation information is input, the other OS application activation command generating unit 108 searches the relevant application data local table 120 (step S302).

When there is an application 208 relevant to the activated application 112 in the relevant application data local table 120, the other OS application activation command generating unit 108 generates an application activation command (step S304). Furthermore, the other OS application activation command generating unit 108 sends the generated application activation command to the second OS 200 (step S306). The application activation command is also output to the automatic switch/completion report control unit 106.

When the application activation command is input, the second OS 200 shifts from a sleep state to a regular activation state. Then, the application activation command decoding unit 206 decodes the application activation command (step S308). The application activation command decoding unit 206 outputs, to the application activation/end processing unit 204, application activation instruction information specifying the application 208 to be activated that is determined as a result of decoding the application activation command.

The application activation/end processing unit 204 starts activating the specified application 208 when the application activation instruction information is input (step S310). When activation of the application 208 is completed (step S312), the application state monitoring unit 202 sends application activation (completion) report information to the automatic switch/completion report control unit 106 of the first OS 100 (step S314).

When the application activation (completion) report information is received, and the activation has been executed according to the application activation command, the automatic switch/completion report control unit 106 instructs the display device 24 to display a message indicating that activation of the corresponding application 208 is completed (step S316).

During a period T1 from when the application 112 is activated in step S300, to when a message indicating that activation of the application 208 has been completed in step S316, a display screen of the first OS 100 is displayed by the display device 24, and the user may continue using the application 112. That is to say, the automatic activation process of the application 208 relevant to the application 112 is executed in a background from the standpoint of the user. Accordingly, the user does not need to wait until the switching process of the OS and application is completed, which increases the convenience for the user.

The automatic switch/completion report control unit 106 further refers to automatic switch setting information input from the input output automatic switch setting unit 110 in advance (step S318). When the automatic switch setting information is indicating "Enable", the automatic switch/completion report control unit 106 instructs the input output switching unit 26 to output an input output switching signal instructing to associate the input device 22 and the display device 24 with the second OS 200 (step S320). At this time, the automatic switch/completion report control unit 106 may instruct the application activation/end processing unit 104 to perform an end process on the application 112.

According to the process of step S320, the display screen of the display device 24 switches to the display screen by the second OS 200, and the contents input to the input device 22 are applied to the second OS 200, and therefore the user is able to use the application 208 (step S322).

Meanwhile, when the automatic switch setting information is indicating "Disable", the automatic switch/completion report control unit 106 does not perform the process of step S320, and ends the other OS application automatic activation process. In this case, the information processing device 1 receives a switch operation for switching the OS input to the input device 22 by the user. When the user inputs an operation for switching the OS to the input device 22, it becomes possible for the user to activate the second OS 200 and use the application 208.

By the above process, it is possible to omit the need for the user to manually reboot the device when switching the OS and pushing a button for instructing the switch, according to the user's intention (automatic switch setting). Furthermore, it is possible to omit the time and effort for looking for a desired application on the OS after the switch and activating the application. Accordingly, with the information processing device 1 that executes the above process, the user's convenience is enhanced.

Flowcharts

Figure 6:
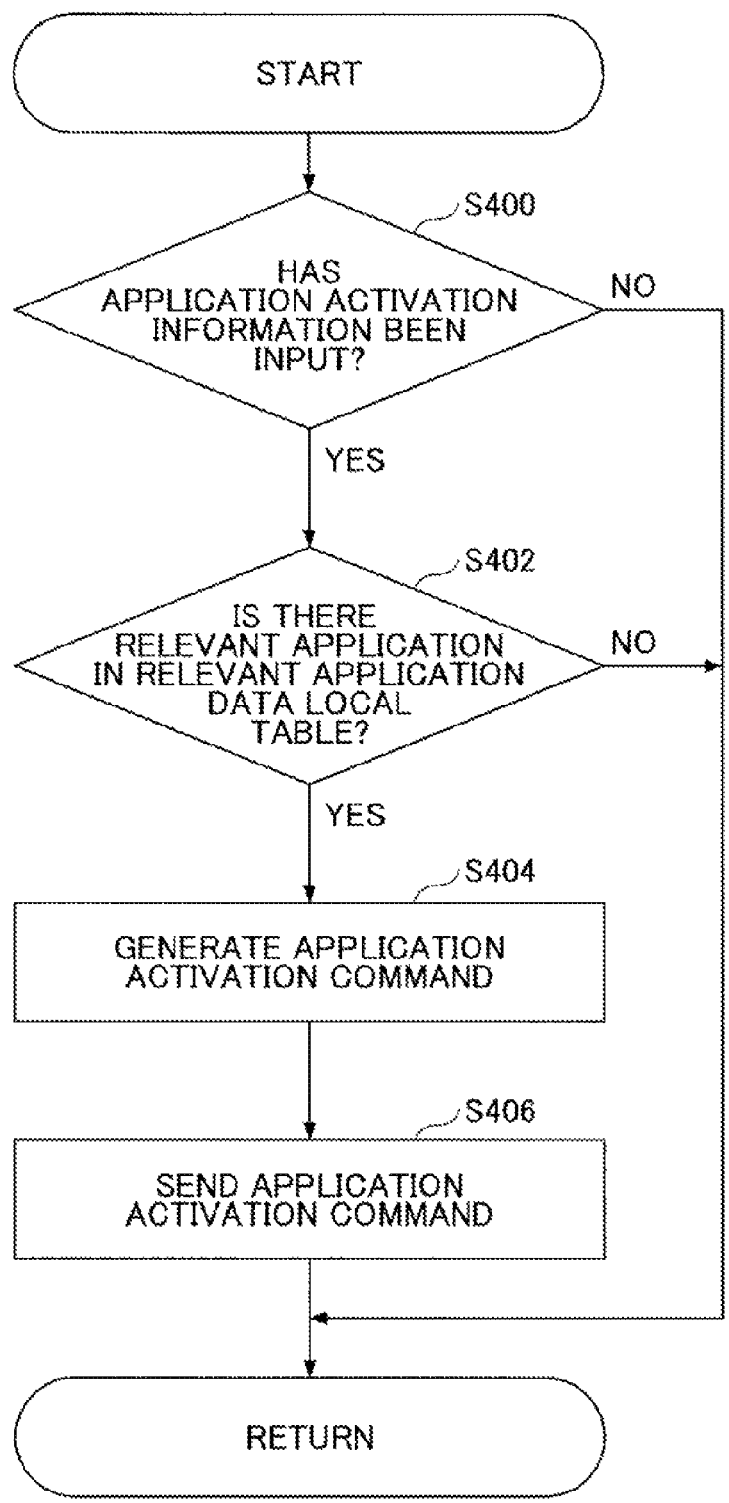
FIG. 6 is a flowchart indicating a flow of a process executed by an other OS application activation command generating unit.
Figure 7:
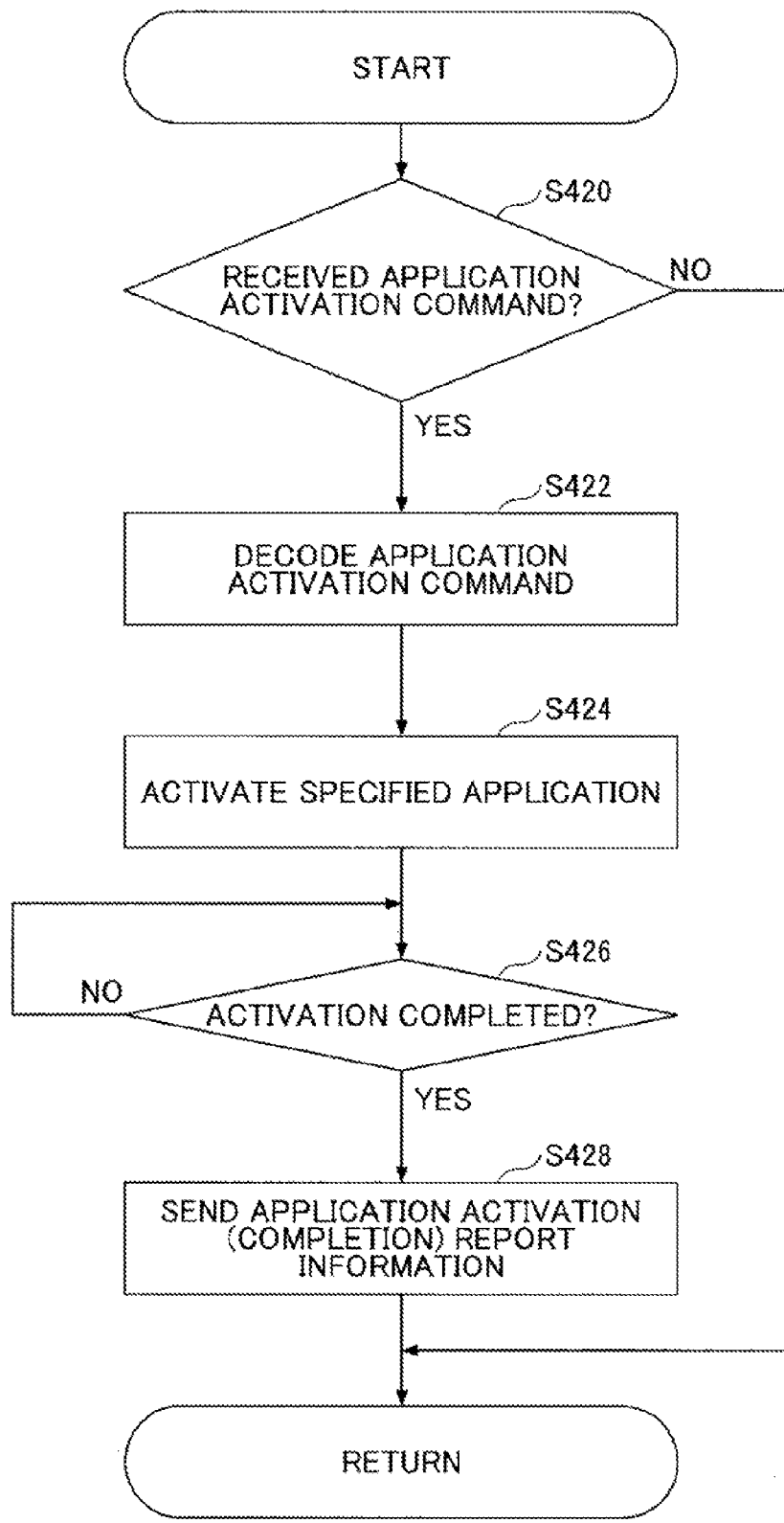
FIG. 7 is a flowchart indicating a flow of a process executed by an application state monitoring unit, an application activation/end processing unit, and an application activation command decoding unit of a second OS.
Figure 8:
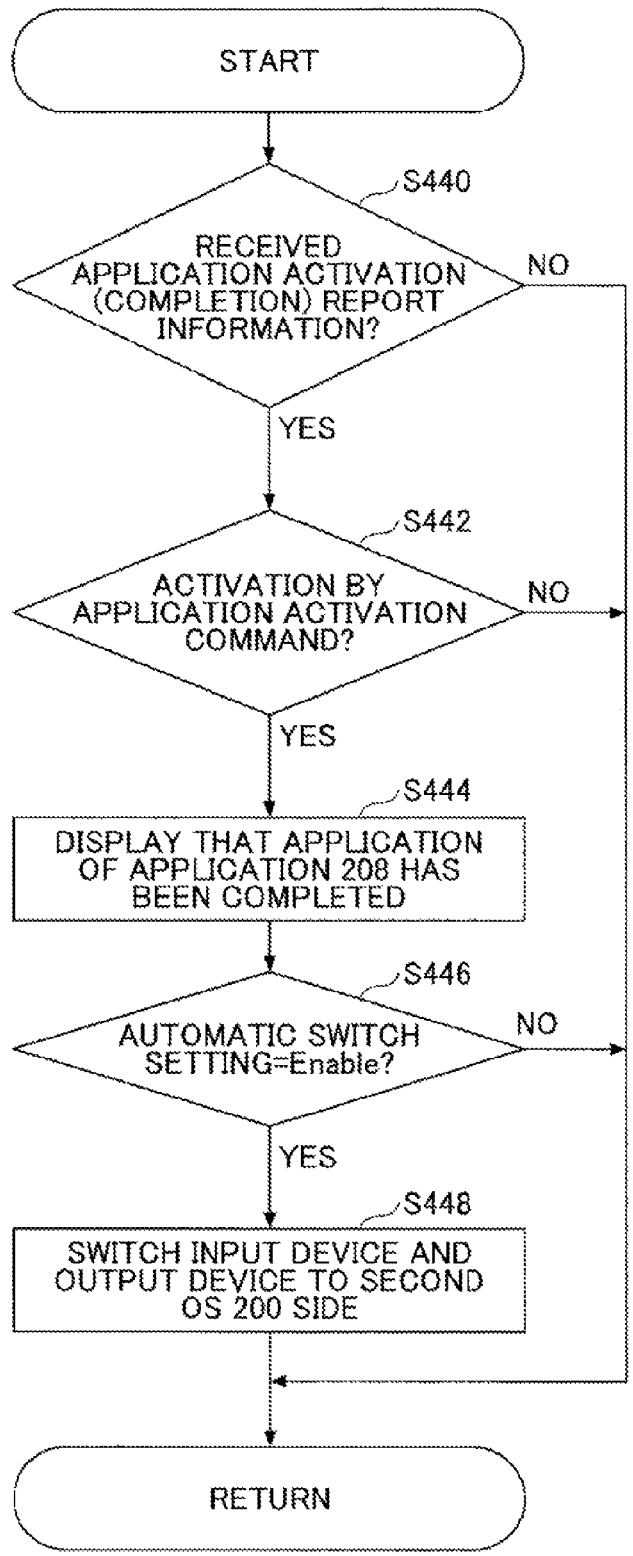
FIG. 8 is a flowchart indicating a flow of a process executed by the automatic switch/completion report control unit.

FIGS. 6 through 8 are flowcharts expressing the process described in the sequence diagram of FIG. 5 in units of functional blocks (or in units of functional block groups).

FIG. 6 is a flowchart indicating a flow of a process executed by the other OS application activation command generating unit 108. This flowchart is repeatedly executed at predetermined periods.

First, the other OS application activation command generating unit 108 determines whether application activation information indicating that the application 112 is activated has been input (step S400). When the application activation information has not been input, the other OS application activation command generating unit 108 ends one routine of this flowchart.

When the application activation information has been input, the other OS application activation command generating unit 108 searches the relevant application data local table 120, and determines whether there is an application 208 relevant to the application 112 indicated by the application activation information (step S402). When there is no application 208 relevant to the application 112 indicated by the application activation information in the relevant application data local table 120, the other OS application activation command generating unit 108 ends one routine of this flowchart. In this determination process, "the corresponding application 208 is not activated" may be added as an "and" condition. That is to say, the condition may be that "there is an application 208 relevant to the application 112 indicated by the application activation information, and the application 208 is not activated".

When there is an application 208 relevant to the application 112 indicated by the application activation information in the relevant application data local table 120, the other OS application activation command generating unit 108 generates an application activation command instructing activation of the corresponding application 208 (step S404). Furthermore, the other OS application activation command generating unit 108 sends the generated application activation command to the application activation command decoding unit 206 of the second OS 200 (step S406).

FIG. 7 is a flowchart indicating a flow of a process executed by the application state monitoring unit 202, the application activation/end processing unit 204, and the application activation command decoding unit 206 of the second OS 200. This flowchart is repeatedly executed at predetermined periods.

First, the application activation command decoding unit 206 determines whether the application activation command has been received (step S420). When the application activation command has not been received, one routine of this flowchart is ended.

When the application activation command has been received, the application activation command decoding unit 206 decodes the application activation command (step S422), and outputs the application activation instruction information to the application activation/end processing unit 204.

The application activation/end processing unit 204 activates the application 208 specified by the application activation instruction information (step S424). When activation of the application 208 is completed, the application activation/end processing unit 204 outputs application activation (completion) report information reporting this to the application state monitoring unit 202.

When activation of the application 208 that started being activated at step S424 is completed (step S426), the application state monitoring unit 202 sends application activation (completion) report information to the automatic switch/completion report control unit 106 of the first OS 100 (step S428).

FIG. 8 is a flowchart indicating a flow of a process executed by the automatic switch/completion report control unit 106. This flowchart is repeatedly executed at predetermined periods.

First, the automatic switch/completion report control unit 106 determines whether the application activation (completion) report information has been received (step S440). When the application activation (completion) report information has not been received, the automatic switch/completion report control unit 106 ends one routine of this flowchart.

When the application activation (completion) report information has been received, the automatic switch/completion report control unit 106 determines whether the activation has been performed by an application activation command (step S442). For example, this determination is performed by determining whether a corresponding application activation command has been input from the other OS application activation command generating unit 108 from a predetermined time before receiving the application activation (completion) report information until the present time. Furthermore, when information indicating whether the activation has been performed by an application activation command is attached to the application activation (completion) report information, this determination may be performed by referring to the attached information. When the activation is not performed by an application activation command, the automatic switch/completion report control unit 106 ends one routine of this flowchart.

Even when the activation is not performed by an application activation command (the activation is performed by some operation by the user), the completion of the activation of the application 208 may be displayed, in which case the determination at step S442 is not mandatory.

When the activation is performed by an application activation command, the automatic switch/completion report control unit 106 instructs the display device 24 to display a message that activation of the corresponding application 208 has been completed (step S444).

Next, the automatic switch/completion report control unit 106 determines whether the automatic switch setting information input from the input output automatic switch setting unit 110 in advance is indicating "Enable" (step S446). When the automatic switch setting information is not indicating "Enable", the automatic switch/completion report control unit 106 ends one routine of this flowchart.

When the automatic switch setting information is indicating "Enable", the automatic switch/completion report control unit 106 instructs the input output switching unit 26 to output an input output switching signal instructing to associate the input device 22 and the display device 24 with the second OS 200 (step S448). That is to say, the input device 22 and the display device 24 are switched to the second OS 200.

Update of Relevant Application Data Local table, Overall Flow

In the following, a description is given of the process of updating the relevant application data local table 120. The process of updating the relevant application data local table 120 is performed by using the function of the server device 500. The server device 500 has a functional configuration including a relevant application data master table generating unit 502, a relevant application data master table 504, and a relevant application data reporting unit 506.

Figure 9:
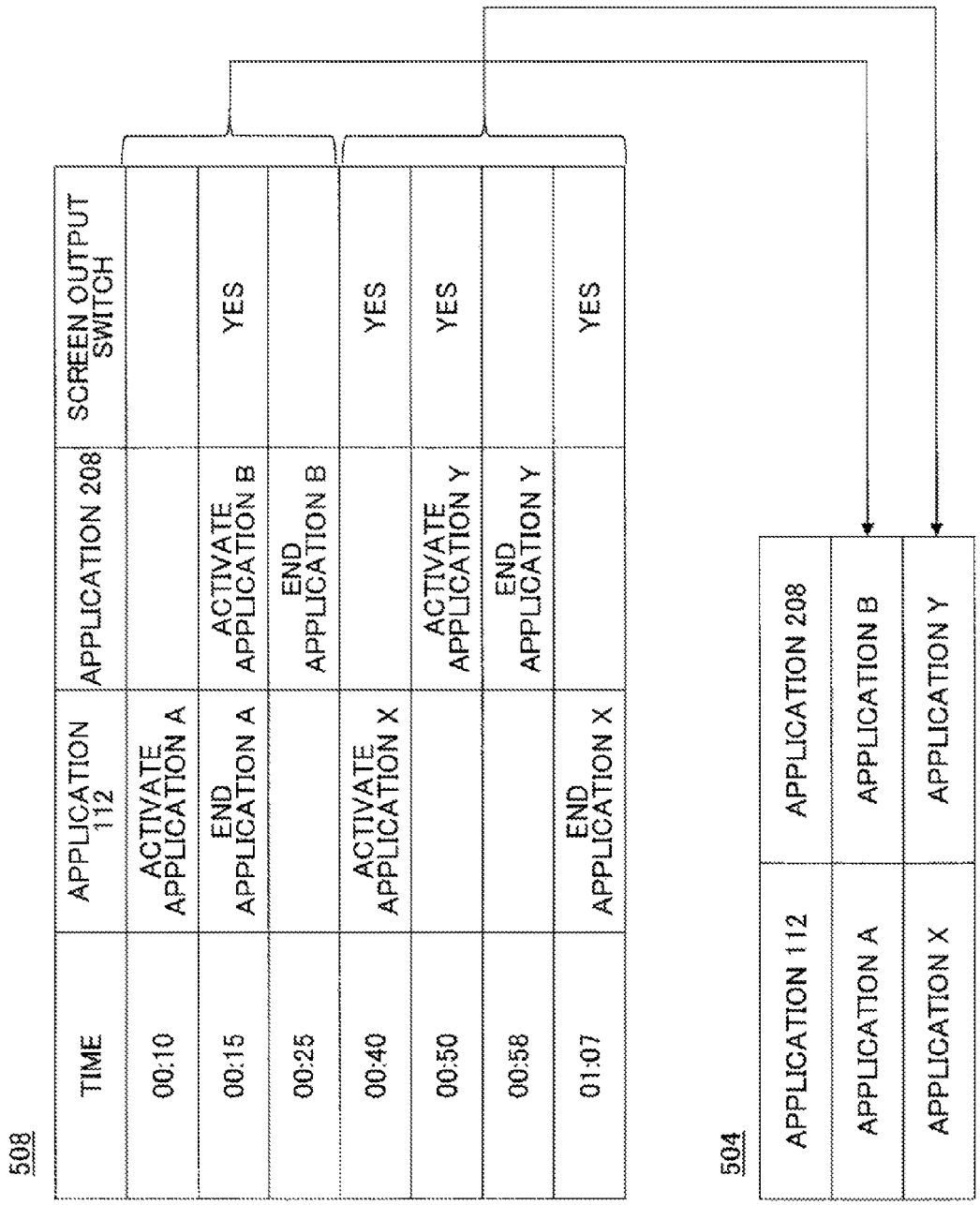
FIG. 9 illustrates activated application log integrated data in which activated application logs and switch information received by the server device from the information processing device are integrated, and a relevant application data master table generated based on the activated application log integrated data.

FIG. 9 illustrates activated application log integrated data 508 in which activated application logs and switch information received by the server device 500 from the information processing device 1 are integrated, and the relevant application data master table 504 generated based on the activated application log integrated data 508.

The activated application log transmitting unit 118 sends, to the server device 500, an activated application log including the type of the activated application 112 and the activation time, among the applications 112 of the first OS 100. The activated application log transmitting unit 214 sends, to the server device 500, an activated application log including the type of the activated application 208 and the activation time, among the applications 208 of the second OS 200.

Furthermore, the input output switching unit 26 sends switch information including the time when the screen output switching is performed, to the server device 500.

The server device 500 integrates the received information items, and creates the activated application log integrated data 508 illustrated in FIG. 9.

Furthermore, the server device 500 (relevant application data master table generating unit 502) generates the relevant application data master table 504 by performing a process of associating the applications based on the activated application log integrated data 508.

The server device 500 determines that there is relevance between the application 112 and the application 208 based on rules such as (1) when the application 208 is activated within a predetermined amount of time from when the application 112 is ended, and (2) when the application 208 is activated when screen output switching is performed while the application 112 is activated. Then, the server device 500 registers the combination of the application 112 and the application 208 that are determined to be relevant, in the relevant application data master table 504. In the example of FIG. 9, the server device 500 determines that an application A included in the applications 112 and an application B included in the applications 208 are relevant, and determines that an application X included in the applications 112 and an application Y included in the applications 208 are relevant.

The server device 500 (relevant application data reporting unit 506) sends, to the information processing device 1, the relevant application data master table 504 generated by the relevant application data master table generating unit 502.

Figure 10:
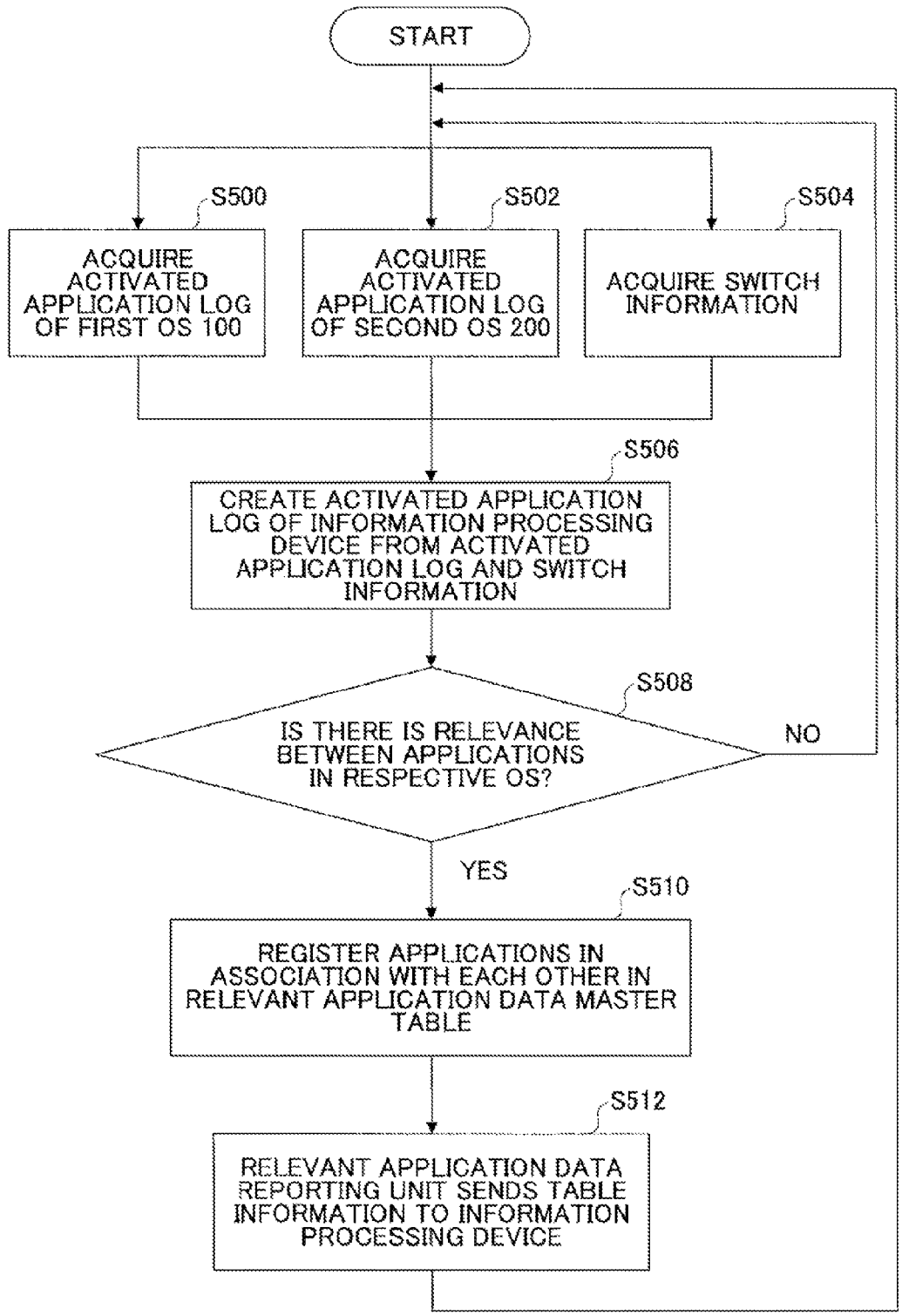
FIG. 10 is a flowchart indicating a flow of a process executed by the server device according to the first embodiment.

FIG. 10 is a flowchart indicating a flow of a process executed by the server device 500 according to the first embodiment.

First, the server device 500 acquires an activated application log of the first OS 100 (step S500), acquires an activated application log of the second OS 200 (step S502), and acquires switch information (step S504).

Next, the server device 500 creates the activated application log integrated data 508 from the acquired activated application logs and switch information (step S506).

Next, the server device 500 determines whether there is any relevance between the applications in the respective OSs (step S508). When there is no relevance between the applications in respective OSs, the process returns to step S500 and the server device 500 acquires the next information item. The relevance between the applications is determined according to the above-described rules, for example.

When there is relevance between the applications in the respective OSs, the server device 500 registers the applications in association with each other in the relevant application data master table 504 (step S510), and sends the relevant application data master table 504 to the information processing device 1 (step S512).

In the information processing device 1, the relevant application data local table 120 is updated based on the received relevant application data master table 504. The relevant application data local table 120 may be updated by entirely overwriting the relevant application data local table 120 with the received relevant application data master table 504, or by holding part of the local data in the information processing device 1 without erasing the local data.

Figure 11:
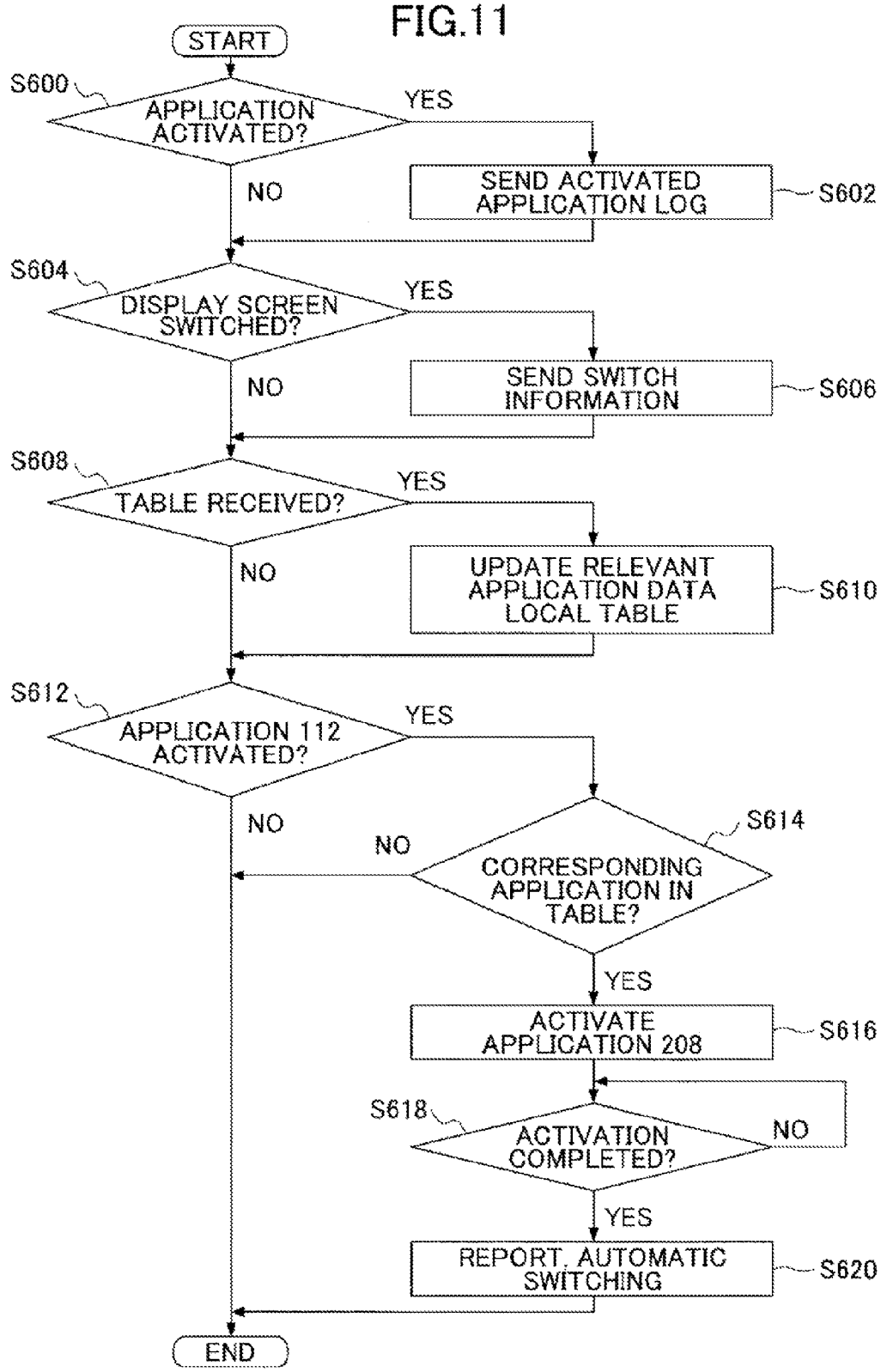
FIG. 11 is a flowchart indicating a flow of the overall process including updating the relevant application data local table executed by the information processing device.

FIG. 11 is a flowchart indicating a flow of the overall process including updating the relevant application data local table 120 executed by the information processing device 1. Details of steps S612 through S620 have been described above with reference to FIGS. 5 through 8.

First, the information processing device 1 determines whether any one of the applications has been activated (step S600), and when any one of the applications has been activated, the activated application log transmitting unit 118 or the activated application log transmitting unit 214 sends the activated application log to the server device 500 (step S602).

Next, the information processing device 1 determines whether the display screen has been switched (step S604), and when the display screen has been switched, the input output switching unit 26 sends switch information to the server device 500 (step S606).

Next, the information processing device 1 determines whether the relevant application data master table 504 has been received (step S608), and when the relevant application data master table 504 has been received, the information processing device 1 updates the relevant application data local table 120 (step S610).

Next, the information processing device 1 determines whether the application 112 is activated (step S612), and when the application 112 is activated, the information processing device 1 determines whether there is a corresponding application 112 in the relevant application data local table 120 (step S614).

When there is a corresponding application 112 in the relevant application data local table 120, the information processing device 1 activates the application 208 associated with the corresponding application 112 in the relevant application data local table 120 (step S616).

Then, the information processing device 1 waits until activation of the application 208 is completed (step S618), and when activation of the application 208 is completed, a report is sent to the user and automatic switching is performed (step S620).

According to the above process, the application 112 and the application 208 are appropriately associated with each other, and as for the applications that are usually continuously used by the user, the applications are smoothly switched without forcing the user to perform troublesome operations. As a result, the convenience of the information processing device 1 is enhanced.

Overview-First Embodiment

According to the control method of the information processing device and the information processing device according to the present embodiment, the convenience of the information processing device is enhanced.

Second Embodiment

A description is given of a control method of an information processing device and the information processing device according to a second embodiment of the present invention with reference to drawings.

Figure 12:
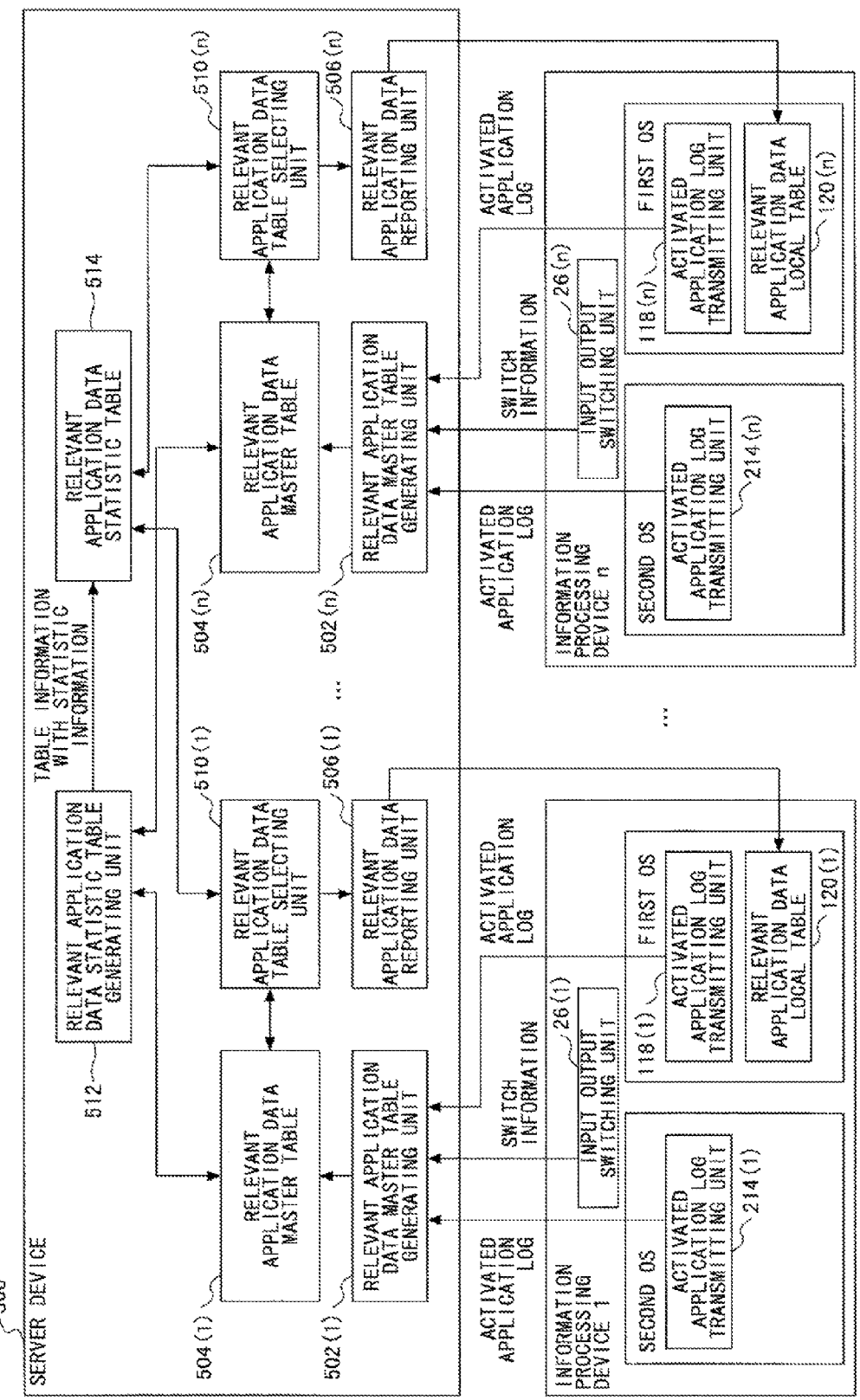
FIG. 12 illustrates functional configurations of information processing devices and the server device according to a second embodiment of the present invention.

FIG. 12 illustrates functional configurations of information processing devices 1 through n and the server device 500 according to the second embodiment of the present invention. As illustrated in FIG. 12, in the present embodiment, plural information processing devices 1 through n and the server device 500 operate in collaboration in an information processing system. The hardware configuration and the functional configuration of the respective information processing devices are the same as those of the first embodiment, and therefore elements other than the input output switching unit 26, the activated application log transmitting units 118 and 214, and the relevant application data local table 120 are not illustrated in FIG. 12.

The server device 500 according to the second embodiment includes the relevant application data master table generating units 502 (1) through 502(n) and the relevant application data master tables 504 (1) through 504(n), which respectively correspond to the information processing devices 1 through n. Furthermore, the server device 500 according to the second embodiment includes relevant application data table selecting units 510 (1) through 510(n) and the relevant application data reporting units 506 (1) through 506(n), which respectively correspond to the information processing devices 1 through n. Furthermore, the server device 500 according to the second embodiment includes a relevant application data statistic table generating unit 512 and a relevant application data statistic table 514. In the following, when the corresponding information processing device is not distinguished, the reference numeral is not accompanied by a numeral in parenthesis ( ), and is described simply as, for example, relevant application data table selecting units 510.

The relevant application data statistic table generating unit 512 performs a statistical process on the relevant application data master tables 504 (1) through 504(n) generated to correspond to the information processing devices 1 through n, and generates the relevant application data statistic table 514. The method of generating the relevant application data master table 504 is the same as the first embodiment, and is thus not further described.

Figure 13:
FIG. 13 illustrates how a relevant application data statistic table is generated based on relevant application data master tables.

FIG. 13 illustrates how the relevant application data statistic table 514 is generated based on the relevant application data master tables 504 (1) through 504 (3). As illustrated in FIG. 13, the relevant application data statistic table generating unit 512 calculates, as a statistical value, the ratio expressing the relevance between the application 112 and the application 208 using the application 112 as a standard, for the combinations of applications described in each relevant application data master table 504.

For example, the relevant application data table selecting unit 510 selects the combination of applications having the highest statistical value from among the plural combinations of applications including the application 112 from the relevant application data statistic table 514. FIG. 14 illustrates how combinations of applications are selected by the relevant application data table selecting unit 510.

Figure 15:
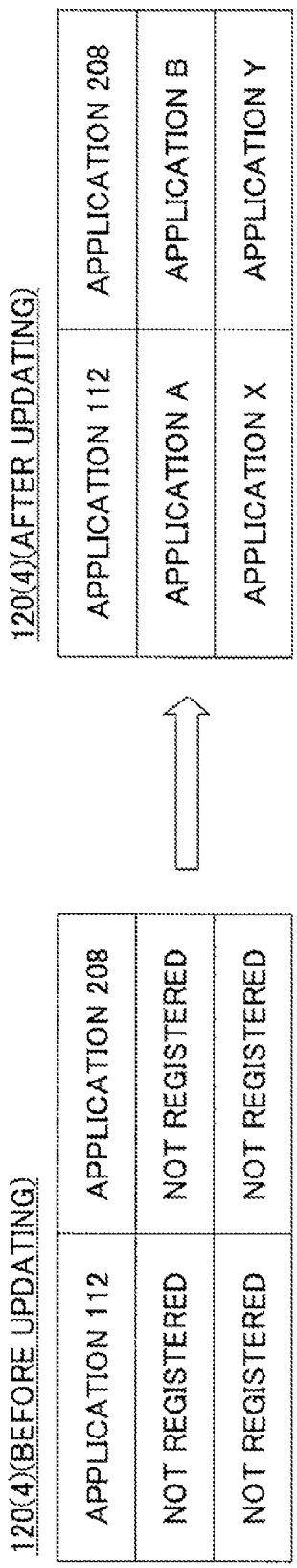
FIG. 15 illustrates how the relevant application data local table of an information processing device is updated, as a result of a statistical process performed by the server device based on the activated application logs collected from the information processing devices.

The relevant application data reporting unit 506 sends data including a collection of combinations of applications selected by the corresponding relevant application data table selecting unit 510, to the corresponding information processing device. FIG. 15 illustrates how the relevant application data local table 120 (4) of an information processing device 4 is updated, as a result of a statistical process performed by the server device 500 based on the activated application logs collected from the information processing devices 1 through 3.

Figure 16:
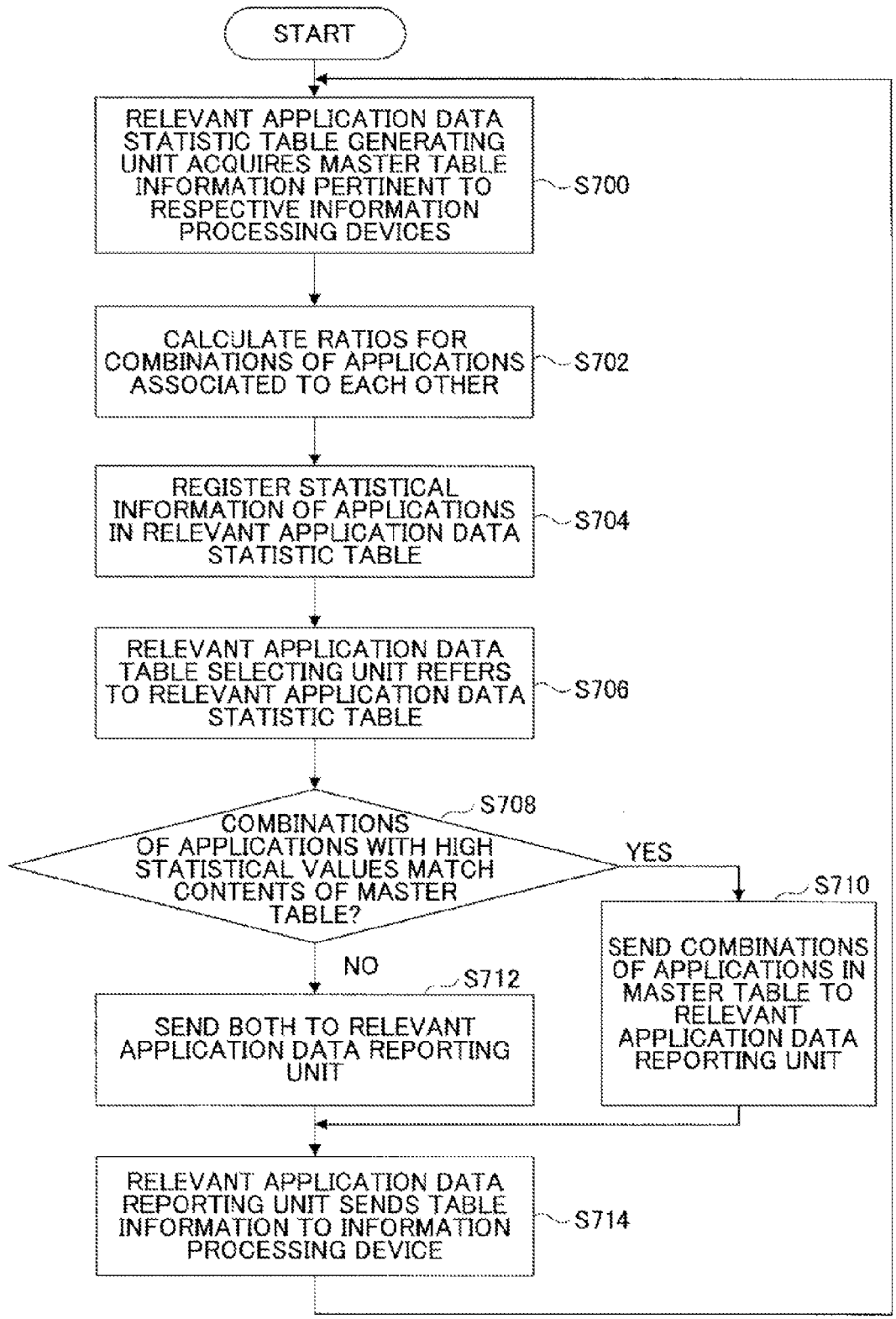
FIG. 16 is a flowchart indicating a flow of a process executed by the server device according to the second embodiment.

FIG. 16 is a flowchart indicating a flow of a process executed by the server device 500 according to the second embodiment.

First, the relevant application data statistic table generating unit 512 acquires the relevant application data master table 504 pertinent to the respective information processing devices (step S700).

Next, the relevant application data statistic table generating unit 512 calculates ratios for the combinations of applications that are associated with each other in the respective relevant application data master tables 504 (step S702). The process of this step is performed by calculating a ratio expressing the relevance between the application 112 and the application 208 using the application 112 as a standard as described above.

Next, the relevant application data statistic table generating unit 512 registers the statistical information of the applications including the calculated ratio, in the relevant application data statistic table 514 (step S704).

Next, each of the relevant application data table selecting units 510 refers to the relevant application data statistic table 514 (step S706), and determines whether the combinations of applications with high statistical values match those in the corresponding relevant application data master table 504 (step S708).

When the combinations of applications with high statistical values match those in the corresponding relevant application data master table 504, the relevant application data table selecting unit 510 sends the combinations of applications stored in the relevant application data master table 504 to the relevant application data reporting unit 506 (step S710). Meanwhile, when the combinations of applications with high statistical values do not match those in the corresponding relevant application data master table 504, the relevant application data table selecting unit 510 sends, for example, both the combinations of applications stored in the relevant application data master table 504 and the combinations of applications with high statistical values, to the relevant application data reporting unit 506 (step S712).

Then, the relevant application data reporting unit 506 sends the received combinations of applications to the corresponding information processing device (step S714). At this time, the relevant application data reporting unit 506 may also send statistical values pertinent to the combinations of applications and identifiers indicating which combinations of applications have high statistical values, together with the combinations of applications.

When information pertinent to combinations of applications generated according to a statistical process in the server device 500 is received, in each information processing device, the relevant application data local table 120 is updated based on the received information.

As described above, in the information received from the server device 500, there may be cases where plural applications 208 are associated with a certain application 112 (see step S712 of FIG. 16). In this case, in the information processing device, for example, a dialog of applications 208 that may be selected by the user is displayed, and the application 208 selected by the user may be activated. Furthermore, when a combination of applications selected according to the statistical process in the server device 500 satisfies a predetermined condition, an application 208 determined by this combination of applications may be activated, without displaying a dialog. For example, a predetermined condition may be that the statistical value is greater than or equal to a threshold (for example, approximately 80%). Furthermore, when the automatic switch setting information is set as Disable, a dialog of applications 208 that may be selected by the user may be displayed and the application 208 selected by the user may be activated. When the automatic switch setting information is set as Enable, the application 208 may be automatically activated.

Figure 17:
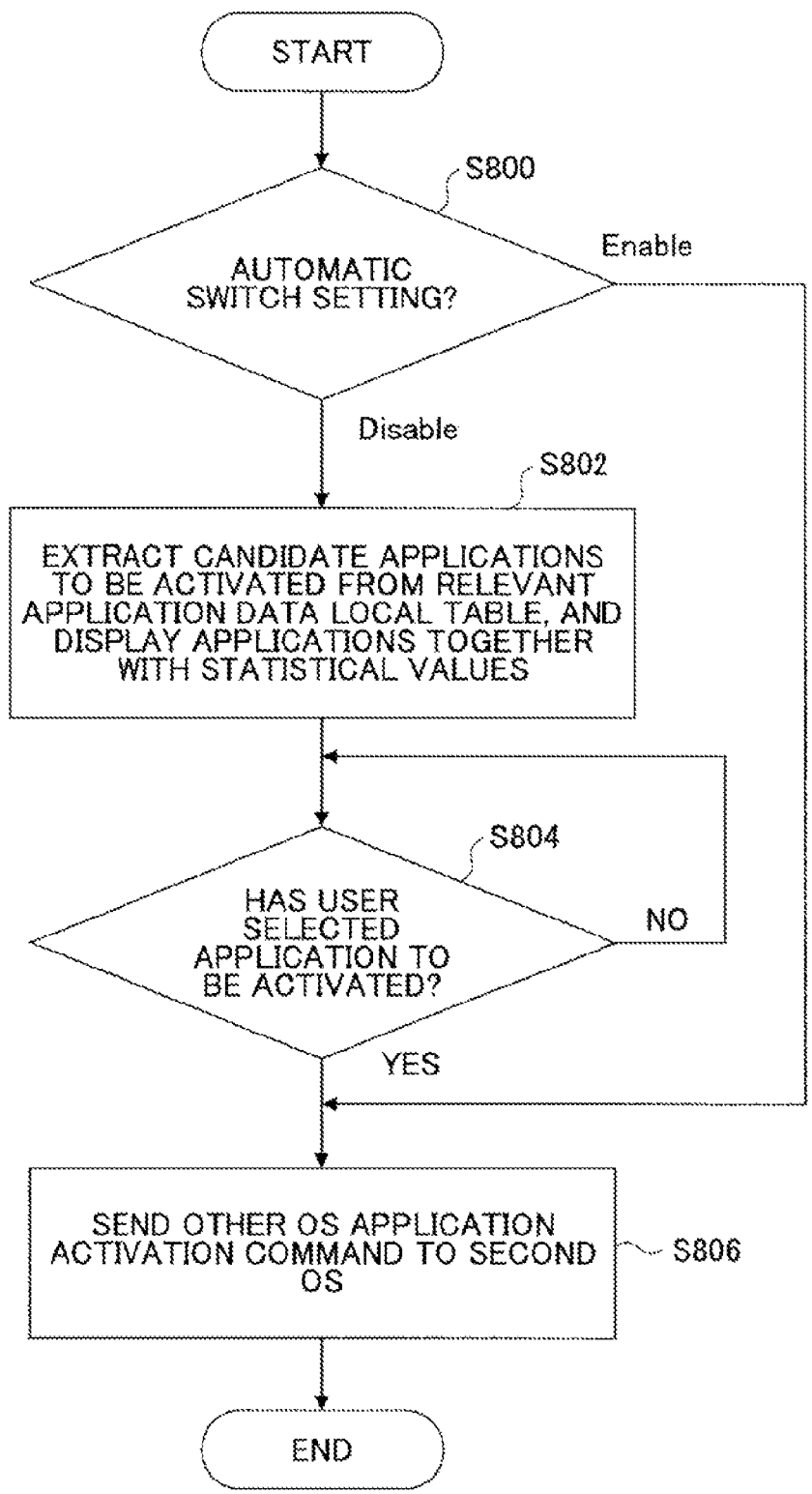
FIG. 17 is a flowchart indicating a flow of a process executed when applications are switched according to automatic switch setting information.

FIG. 17 is a flowchart indicating a flow of a process executed when applications are switched according to the automatic switch setting information.

First, the information processing device determines whether the automatic switch setting is Enable or Disable (step S800).

When the automatic switch setting is Disable, the information processing device extracts one or more applications 208 (candidate applications 208) associated with the application 112 that is activated, from the relevant application data local table 120, and displays the applications 208 together with statistical values (step S802).

Then, the information processing device waits until a user selects any one of the applications 208 (step S804), and sends an other OS application activation command to the second OS 200 (step S806).

Meanwhile, when the automatic switch setting is Enable, the information processing device simply sends the other OS application activation command to the second OS 200 without displaying the applications 208 (step S806). Even when the automatic switch setting is Enable, if the statistical value of the combination of applications selected according to the statistical process in the server device 500 is less than the threshold, the information processing device may display the candidate applications 208.

According to the above process, the application 112 and the application 208 are appropriately associated with each other, and as for the applications that are usually continuously used by the user, the applications are smoothly switched without forcing the user to perform troublesome operations. Furthermore, information pertinent to combinations of applications, to which activated application logs of other information processing devices is applied, is input from the server device 500, and therefore a relevant combination of applications that the user has been unaware of may be presented to the user, so that the convenience of the information processing device is enhanced.

Overview-Second Embodiment

According to the control method of the information processing device and the information processing device according to the present embodiment, the convenience of the information processing device is enhanced.

Third Embodiment

A description is given of a control method of an information processing device and the information processing device according to a third embodiment of the present invention with reference to drawings.

Figure 18:
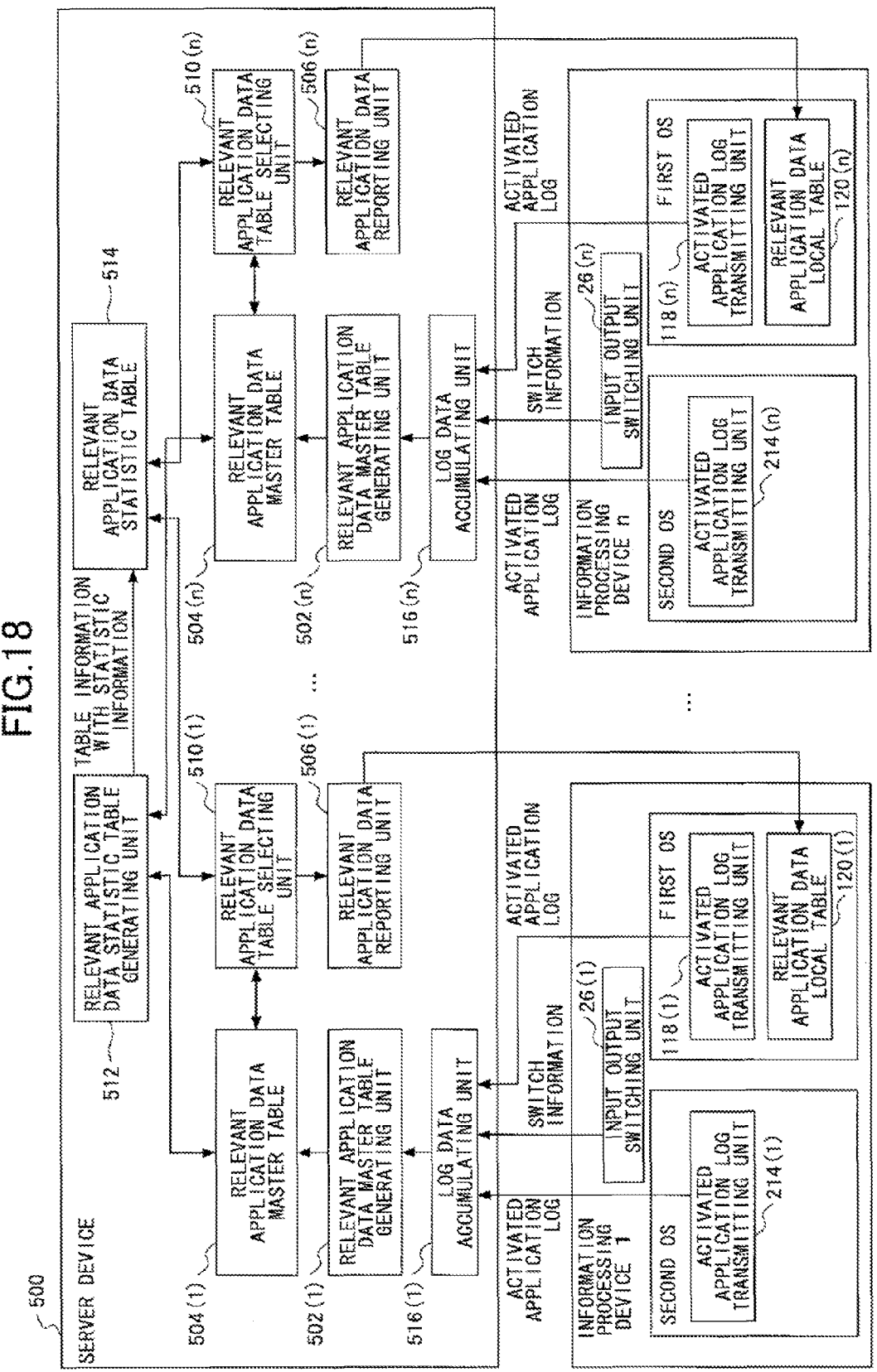
FIG. 18 illustrates functional configurations of information processing devices and the server device according to a third embodiment of the present invention.

FIG. 18 illustrates functional configurations of information processing devices 1 through n and the server device 500 according to the third embodiment of the present invention. As illustrated in FIG. 18, in the present embodiment, plural information processing devices 1 through n and the server device 500 operate in collaboration in an information processing system. The hardware configuration and the functional configuration of the respective information processing devices are the same as those of the first embodiment, and therefore elements other than the input output switching unit 26, the activated application log transmitting units 118 and 214, and the relevant application data local table 120 are not further described or illustrated in FIG. 18.

The server device 500 according to the third embodiment includes log data accumulating units 516 (1) through 516(n), which respectively correspond to the information processing devices 1 through n. Otherwise, the configuration is the same as that of the second embodiment, and therefore common elements are denoted by the same reference numerals. In the following, when the corresponding information processing device is not distinguished, the reference numeral is not accompanied by a numeral in parenthesis ( ), and is described simply as, for example, relevant application data table selecting units 510.

The relevant application data master table generating unit 502 according to the third embodiment generates the relevant application data master table 504 in which statistical values are described, based on the activated application log integrated data 508 created by the log data accumulating unit 516 by accumulating activated application logs.

Figure 19:
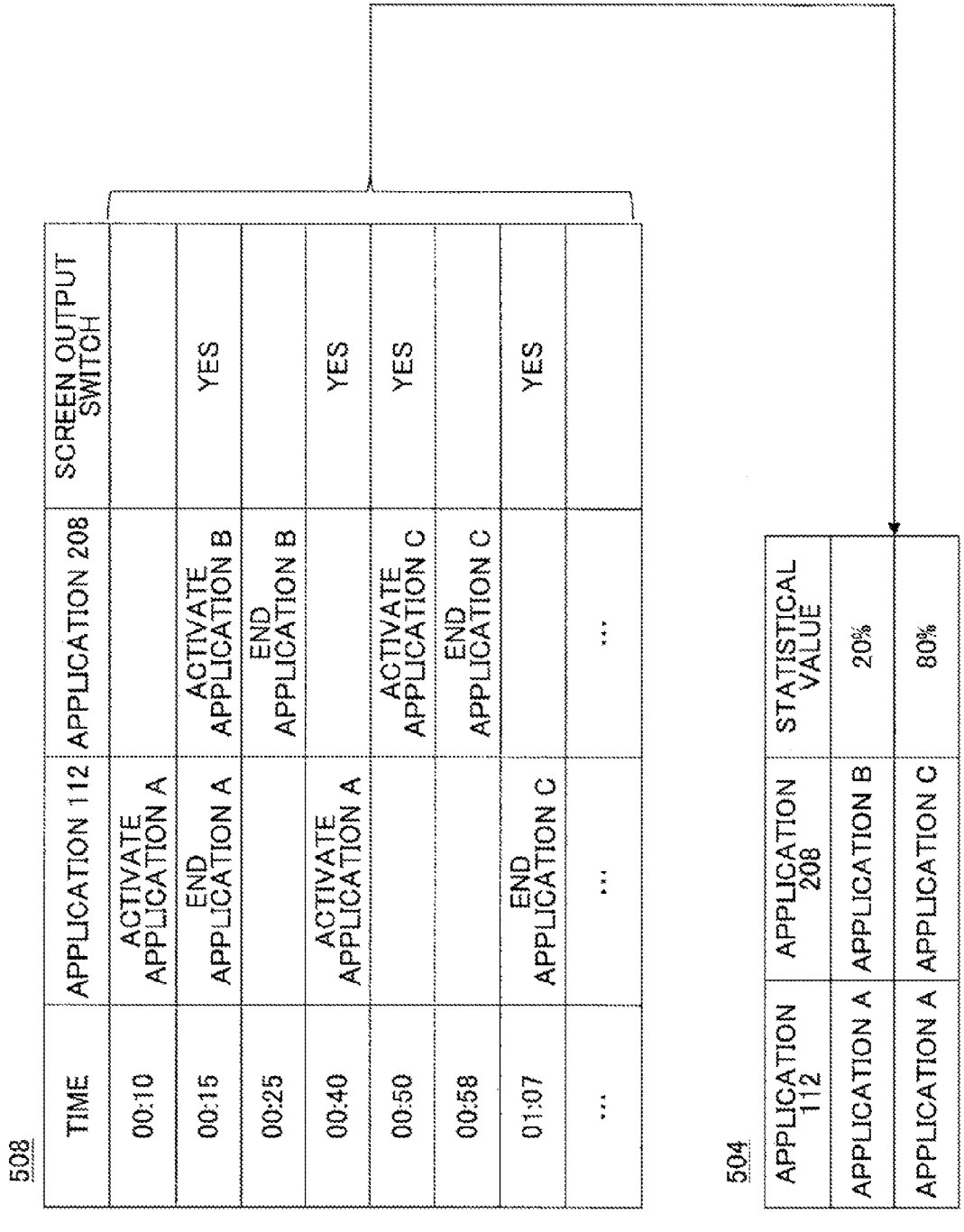
FIG. 19 illustrates how the relevant application data master table is generated by a relevant application data master table generating unit.

FIG. 19 illustrates how the relevant application data master table 504 is generated by the relevant application data master table generating unit 502. The relevant application data master table generating unit 502 according to the third embodiment calculates a ratio as a statistical value expressing the relevance between the application 112 and the application 208 using the application 112 as a standard, based on the frequency that the applications appear in the activated application log integrated data 508.

In the second embodiment, in the relevant application data master table 504, only one application 208 is associated with a certain application 112, in each information processing device. However, in the third embodiment, in the relevant application data master table 504, there may be plural applications 208 associated with a certain application 112 in each information processing device, and a statistical value is described for each application 208.

The relevant application data statistic table generating unit 512 generates the relevant application data statistic table 514 by applying the statistical value described for each relevant application data master table 504. FIG. 20 illustrates how the relevant application data statistic table 514 is generated based on the relevant application data master tables 504 (1) through (3).

As a result of the above process, the bias in activated applications in the respective information processing devices is applied to the relevant application data statistic table 514, and therefore the relevance between applications is expressed more accurately.

Then, the relevant application data table selecting unit 510 according to the third embodiment prioritizes the statistical values in the relevant application data master table 504 over those of the relevant application data statistic table 514, and applies the prioritized statistical values in selecting the combination of applications to be sent to the information processing devices. FIG. 21 illustrates how a relevant application data local table 120 (1) of the information processing device 1 is updated as a result of the statistical process performed by the server device 500 based on the activated application logs collected from the information processing devices 1 through 3. As illustrated in FIG. 21, in the relevant application data local table 120 (1), statistical values in accordance with the activated application logs sent by the device itself are described, for the applications 208 associated with application A. Meanwhile, as for the applications 208 associated with an application X not included in the relevant application data master table 504 (1), statistical values in accordance with the relevant application data statistic table 514 are described. As a result, the relevant application data local table 120 is updated by prioritizing the relevance between applications continuously activated by the user, and moderately applying the activated application logs collected from other information processing devices.

Figure 22:
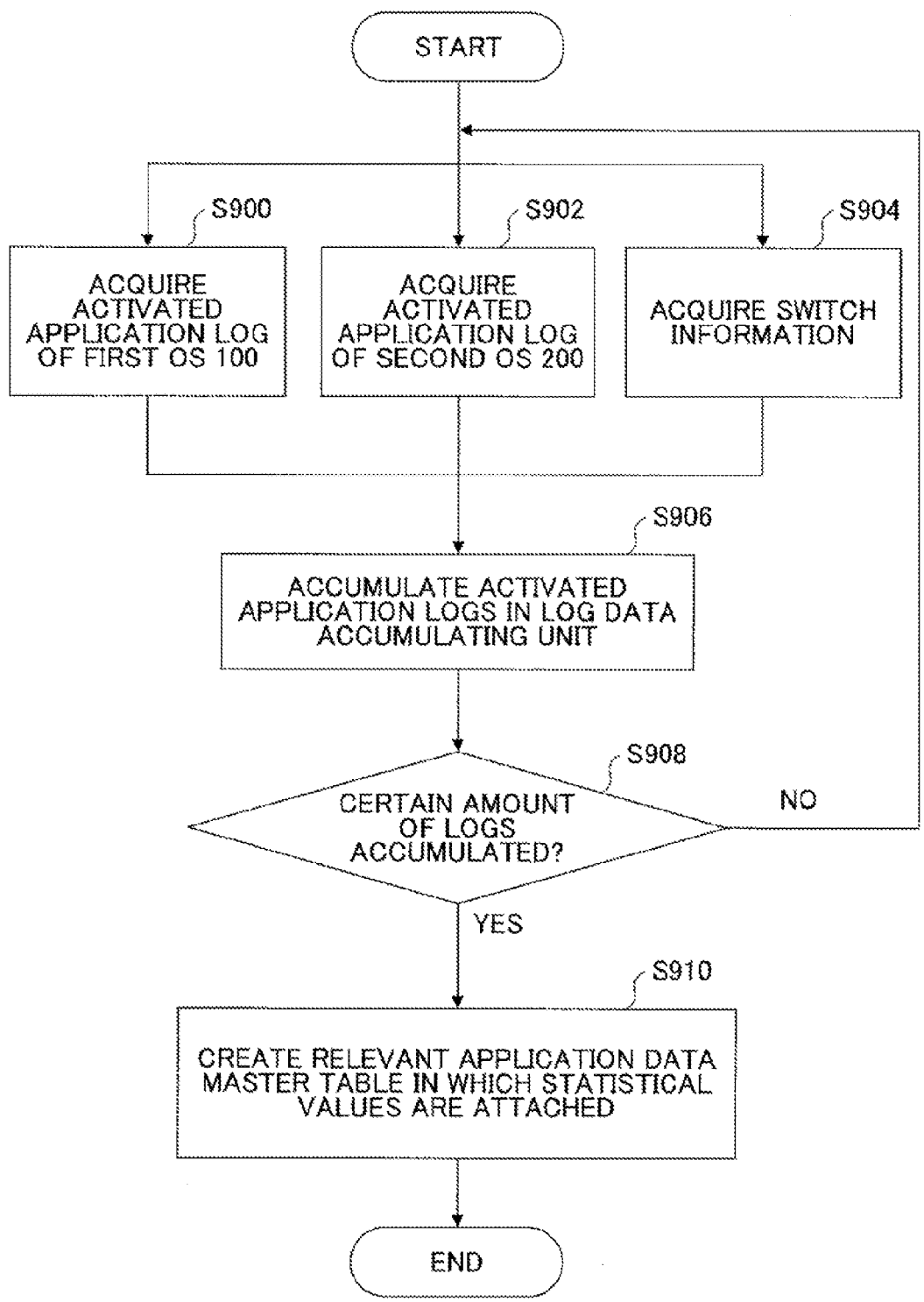
FIG. 22 is a flowchart indicating a flow of a process executed by the server device according to the third embodiment.

FIG. 22 is a flowchart indicating a flow of a process executed by the server device 500 according to the third embodiment.

The server device 500 acquires an activated application log of the first OS 100 (step S900), acquires an activated application log of the second OS 200 (step S902), and acquires switch information (step S904).

Next, the server device 500 accumulates the acquired activated application logs in the log data accumulating unit 516, and creates the activated application log integrated data 508 (step S906).

Next, the server device 500 determines whether a certain amount of logs is accumulated in the log data accumulating unit 516 (step S908). When a certain amount of logs is not accumulated in the log data accumulating unit 516, the process returns to step S900 and the server device 500 acquires the next data.

When a certain amount of logs is accumulated in the log data accumulating unit 516, the relevant application data master table generating unit 502 generates the relevant application data master table 504 in which the statistical values are described (step S910).

Figure 23:
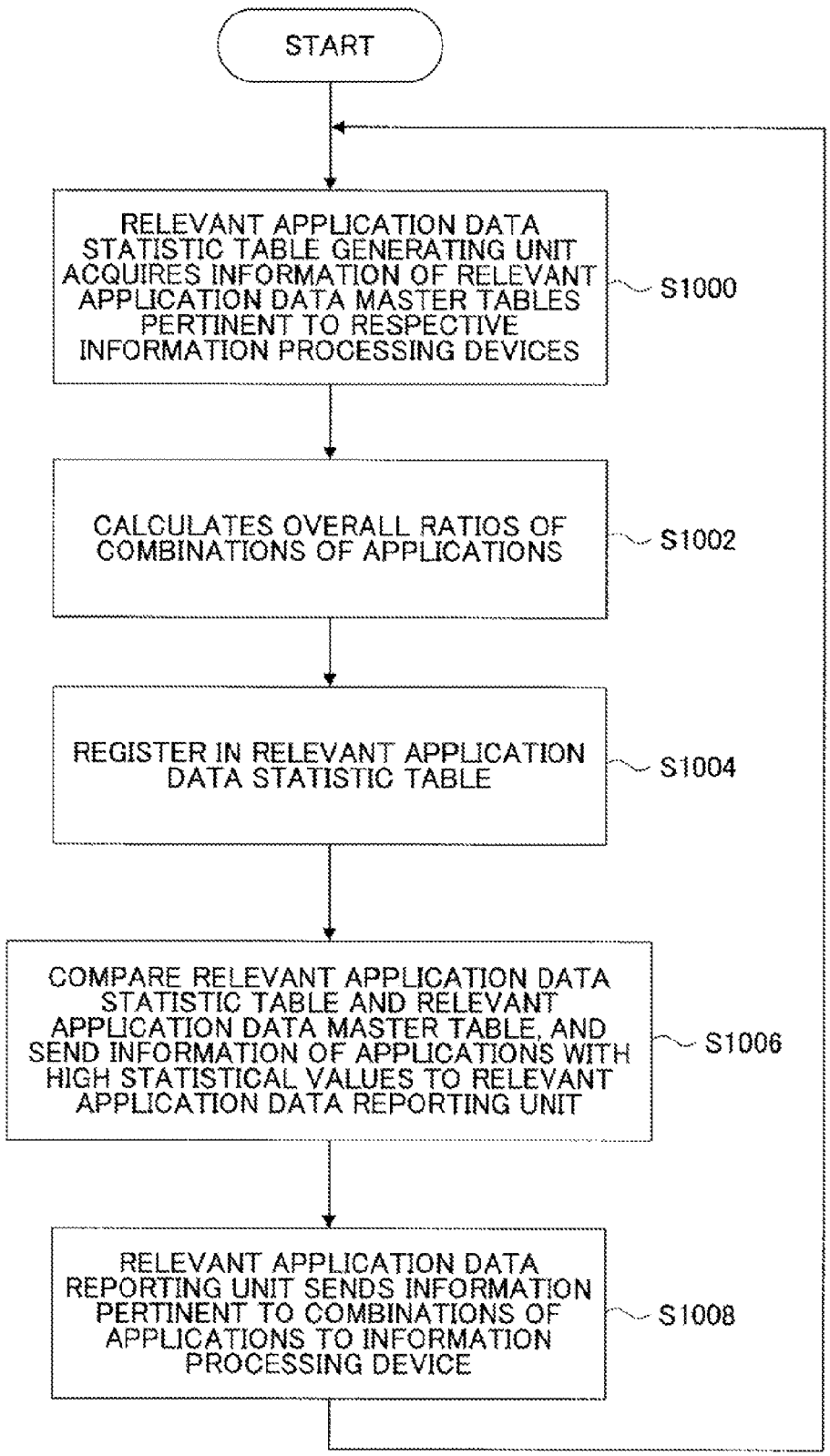
FIG. 23 is a flowchart indicating a flow of creating the relevant application data statistic table and comparing the relevant application data statistic table with the relevant application data master table, executed by the server device according to the third embodiment.

FIG. 23 is a flowchart indicating a flow of creating the relevant application data statistic table 514 and comparing the relevant application data statistic table 514 with the relevant application data master table 504, executed by the server device 500 according to the third embodiment.

First, the relevant application data statistic table generating unit 512 acquires information of the relevant application data master tables 504 pertinent to the respective information processing devices (step S1000).

Next, the relevant application data statistic table generating unit 512 compiles the ratios of combinations of associated applications in the respective relevant application data master tables 504, and calculates the overall ratios of combinations of applications (taking into account the ratios from all information processing devices) (step S1002).

Next, the relevant application data statistic table generating unit 512 registers the calculated ratios of combinations of applications in the relevant application data statistic table 514 (step S1004). The relevant application data statistic table generating unit 512 may update the relevant application data statistic table 514 by adding the ratios calculated in step S1002 to the ratios already registered in the relevant application data statistic table 514 and obtaining averages.

Next, the relevant application data table selecting unit 510 compares the relevant application data statistic table 514 and the relevant application data master table 504, and sends information pertinent to combinations of applications with high usage ratios, to the relevant application data reporting unit 506 (step S1006).

Next, the relevant application data reporting unit 506 sends the information pertinent to the combinations of applications to the corresponding information processing device (step S1008).

The process of the information processing device after receiving the information pertinent to the combinations of applications from the server device 500 is the same as that of the second embodiment, and is thus not further described in detail. The information processing device proposes activation of the application 208 to the user or automatically activates the application 208, based on the automatic switch setting and comparison results of statistical values.

By the above process, the application 112 and the application 208 are appropriately associated with each other, and as for the applications that are usually continuously used by the user, the applications are smoothly switched without forcing the user to perform troublesome operations. Furthermore, information pertinent to combinations of applications, to which activated application logs of other information processing devices are applied, is input from the server device 500, and therefore a relevant combination of applications that the user has been unaware of may be presented to the user, so that the convenience of the information processing device is enhanced.

Overview-Third Embodiment

According to the control method of the information processing device and the information processing device according to the present embodiment, the convenience of the information processing device is enhanced.

The present invention is not limited to the specific embodiments described herein, and variations and modifications may be made without departing from the scope of the present invention.

For example, in the above embodiments, only the switching from the application 112 to the application 208 is described; however, the same process may be performed for switching from the application 208 to the application 112.

Figure 24:
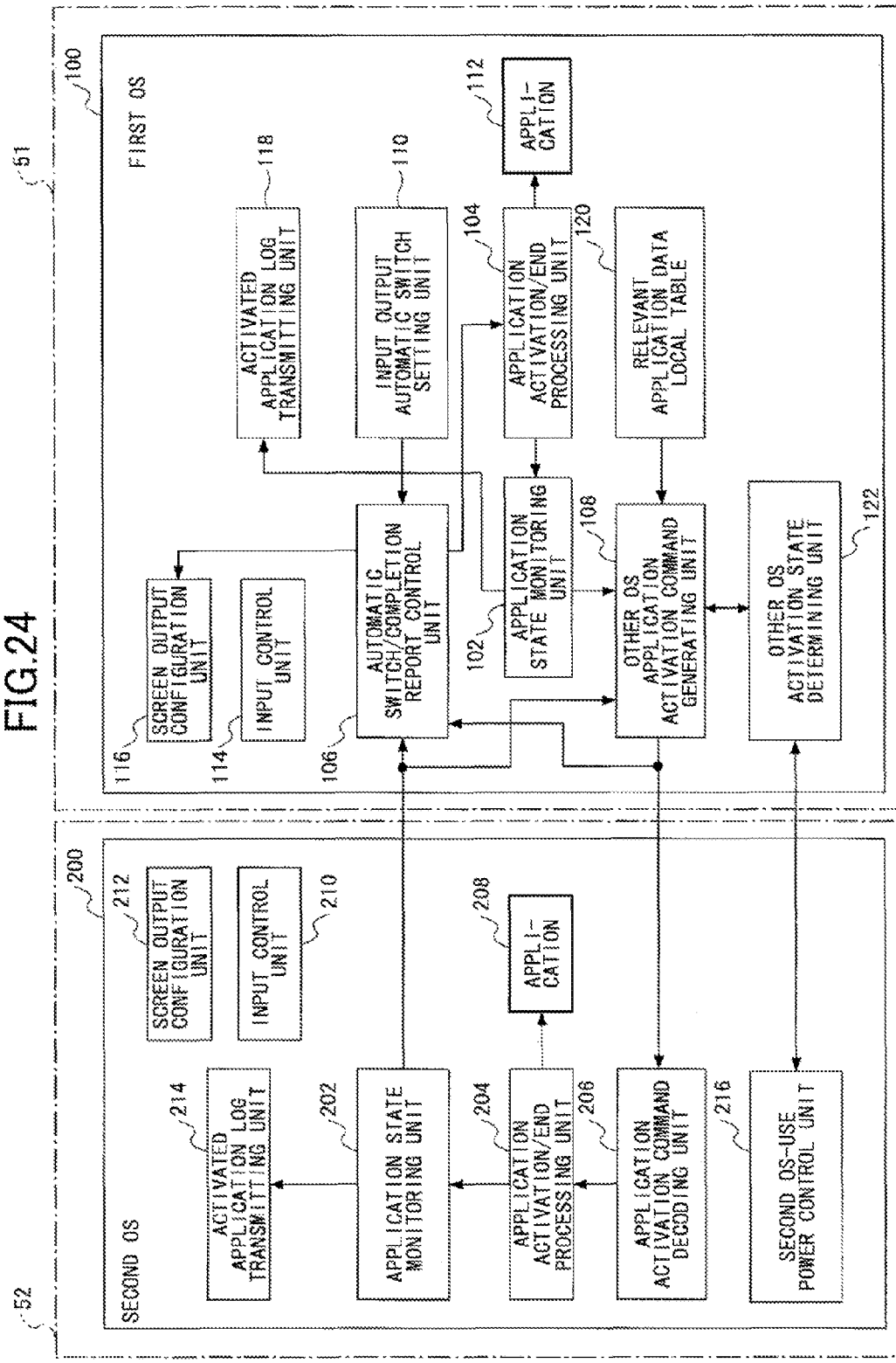
FIG. 24 illustrates a functional configuration of an information processing device according to another embodiment.

Furthermore, the first OS 100 and the second OS 200 operate on the same platform in the above descriptions; however, the first OS 100 and the second OS 200 may operate on different platforms. FIG. 24 illustrates a functional configuration of an information processing device according to another embodiment. In FIG. 24, the first OS 100 operates on a platform 51, and the second OS 200 operates on a platform 52. In this configuration, when the first OS 100 is in an activated state, the second OS 200 may be turned off to be in a stopped state. Therefore, an other OS activation state determining unit 122 operating on the first OS 100 determines the activation state of the second OS 200, and before giving an instruction to activate the application 208 from the first OS 100, a request to activate the second OS 200 is given to a second OS-use power control unit 216.

According to an aspect of the embodiments, the convenience of the information processing device is enhanced.

The present invention is not limited to the specific embodiments described herein, and variations and modifications may be made without departing from the scope of the present invention. Furthermore, all or some of the elements constituting the above embodiments may be combined.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A method of controlling an information processing device, the method comprising:
    selectively switching a first processor configured to execute a first operating system or a second processor configured to execute a second operating system to a user interface;
    storing a data table in which a first application program operating on the first operating system is associated with a second application program operating on the second operating system;
    sending information pertinent to activation of the first application program or the second application program to a server device;
    receiving a process result of a process from the server device, the process being performed by the server device for associating application programs based on the information received from the information processing device;
    updating the data table based on the process result received from the server device; and
    activating the second application program, which is associated with the first application program being activated in the data table, in a state where the first processor has been switched to the user interface.

2. The method according to claim 1, wherein
    the process of associating application programs includes performing a statistical process on the information received from a plurality of the information processing devices.

3. The method according to claim 2, wherein
    when a first relevance between application programs derived from the information received from one of the plurality of the information processing devices does not match a second relevance between application programs obtained by performing the statistical process on the information received from the plurality of the information processing devices, both the first relevance and the second relevance that do not match each other are sent from the server device to the one of the plurality of the information processing devices, and
    the first relevance and the second relevance received from the server device are stored in the data table by the one of the plurality of the information processing devices, and when there are a plurality of the second application programs associated with the first application program being activated in the data table, an operation input by a user is received by the one of the plurality of the information processing devices for determining which one of the plurality of the second application programs is to be activated.

4. An information processing device comprising:
    a first processor configured to execute a first operating system;
    a second processor configured to execute a second operating system;
    a switch unit configured to selectively switch the first processor or the second processor to a user interface;
    a storage unit configured to store a data table in which a first application program operating on the first operating system is associated with a second application program operating on the second operating system; and
    an activation information sending unit configured to send information pertinent to activation of the first application program or the second application program to a server device, wherein
    a process result of a process of associating application programs performed at the server device is received from the server device, and the data table is updated based on the process result, and
    the second application program, which is associated with the first application program being activated in the data table, is activated, in a state where the switch unit has switched the first processor to the user interface.

5. The information processing device according to claim 4, wherein
    the server device is configured to perform the process of associating application programs by performing a statistical process on the information received from a plurality of the information processing devices.

6. The information processing device according to claim 5, wherein
    when a first relevance between application programs derived from the information received from one of the plurality of the information processing devices does not match a second relevance between application programs obtained by performing the statistical process on the information received from the plurality of the information processing devices, the server device is configured to send both the first relevance and the second relevance that do not match each other to the one of the plurality of the information processing devices, and
    the one of the plurality of the information processing devices is configured to store the first relevance and the second relevance received from the server device in the data table, and when there are a plurality of the second application programs associated with the first application program being activated in the data table, the one of the plurality of the information processing devices is configured to receive an operation input by a user for determining which one of the plurality of the second application programs is to be activated.

7. A non-transitory computer-readable recording medium storing a program for controlling an information processing device, wherein the program causes the information processing device to execute a method comprising:

selectively switching a first processor configured to execute a first operating system or a second processor configured to execute a second operating system to a user interface;

storing a data table in which a first application program operating on the first operating system is associated with a second application program operating on the second operating system;

sending information pertinent to activation of the first application program or the second application program to a server device;

receiving a process result of a process from the server device, the process being performed by the server device for associating application programs based on the information received from the information processing device;

updating the data table based on the process result received from the server device; and activating the second application program, which is associated with the first application program being activated in the data table, in a state where the first processor has been switched to the user interface.

8. The non-transitory computer-readable recording medium according to claim 7, wherein the process of associating application programs includes performing a statistical process on the information received from a plurality of the information processing devices.

9. The non-transitory computer-readable recording medium according to claim 8, wherein when a first relevance between application programs derived from the information received from one of the plurality of the information processing devices does not match a second relevance between application programs obtained by performing the statistical process on the information received from the plurality of the information processing devices, both the first relevance and the second relevance that do not match each other are sent from the server device to the one of the plurality of the information processing devices, and the first relevance and the second relevance received from the server device are stored in the data table by the one of the plurality of the information processing devices, and when there are a plurality of the second application programs associated with the first application program being activated in the data table, an operation input by a user is received by the one of the plurality of the information processing devices for determining which one of the plurality of the second application programs is to be activated.

\* \* \* \* \*